(12) United States Patent
Zha

(10) Patent No.: US 11,273,907 B2
(45) Date of Patent: *Mar. 15, 2022

(54) FLUID SYSTEMS THAT INCLUDE A CO-FLOW JET

(71) Applicant: COFLOW JET, LLC, Cutler Bay, FL (US)

(72) Inventor: Gecheng Zha, Cutler Bay, FL (US)

(73) Assignee: COFLOW JET, LLC, Cutler Bay, FL (US)

( * ) Notice: Subject to any disclaimer, the term of this patent is extended or adjusted under 35 U.S.C. 154(b) by 398 days.

This patent is subject to a terminal disclaimer.

(21) Appl. No.: 16/421,872

(22) Filed: May 24, 2019

(65) Prior Publication Data

US 2019/0337609 A1 Nov. 7, 2019

Related U.S. Application Data

(63) Continuation of application No. 15/426,084, filed on Feb. 7, 2017, now Pat. No. 10,315,754, which is a
(Continued)

(51) Int. Cl.
*B64C 21/02* (2006.01)
*B64C 21/08* (2006.01)

(52) U.S. Cl.
CPC ............ *B64C 21/025* (2013.01); *B64C 21/08* (2013.01); *B64C 2230/04* (2013.01); *B64C 2230/06* (2013.01); *Y02T 50/10* (2013.01)

(58) Field of Classification Search
CPC ... B64C 21/025; B64C 21/08; B64C 2230/04; B64C 2230/06; F15D 1/008; F01D 5/145
See application file for complete search history.

(56) References Cited

U.S. PATENT DOCUMENTS

| 1,580,577 A | 4/1926 | Baumann |
| 1,714,608 A | 5/1929 | Massey |

(Continued)

FOREIGN PATENT DOCUMENTS

| CN | 104176241 | 12/2014 |
| CN | 104149967 | 5/2015 |

(Continued)

OTHER PUBLICATIONS

World Intellectual Property Organization, English Translation of CN 104149967, retrieved from Internet Oct. 4, 2019, pp. 1-4.
(Continued)

*Primary Examiner* — Joseph W Sanderson
(74) *Attorney, Agent, or Firm* — MacMillan, Sobanski & Todd, LLC

(57) ABSTRACT

A fluid system has a lengthwise axis, a chord length, a first body portion, a second body portion, a spacer, and a fluid pressurizer. The first body portion and the second body portion cooperatively define an injection opening, a suction opening, and a channel that extends from the injection opening to the suction opening. The fluid pressurizer is disposed within the channel cooperatively defined by the first body portion and the second body portion. The first body portion defines a cavity that is sized and configured to filter debris that enters the channel during use and provide a mechanism for removing the debris from the system.

20 Claims, 13 Drawing Sheets

Related U.S. Application Data continuation-in-part of application No. 15/255,523, filed on Sep. 2, 2016, now Pat. No. 10,106,246.

(60) Provisional application No. 62/348,344, filed on Jun. 10, 2016.

(56) References Cited

U.S. PATENT DOCUMENTS

| | | |
|---|---|---|
| 1,771,257 A | 7/1930 | Ingram |
| 1,772,196 A | 8/1930 | Wallace |
| 1,806,927 A | 5/1931 | Aldrich |
| 1,810,693 A | 6/1931 | Alfaro |
| 1,845,307 A | 2/1932 | Maxwell |
| 1,861,336 A | 5/1932 | Cox |
| 1,888,871 A | 11/1932 | Apperman |
| 1,993,419 A | 3/1935 | Stalker |
| 2,039,676 A | 5/1936 | Zaparka |
| 2,041,795 A | 5/1936 | Stalker |
| 2,063,030 A | 12/1936 | Crouch |
| 2,071,744 A | 2/1937 | Anathor-Henrikson |
| 2,075,817 A | 4/1937 | Loerke |
| 2,077,071 A | 4/1937 | Rose |
| 2,078,854 A | 4/1937 | Jones |
| 2,082,674 A | 6/1937 | Young |
| 2,219,234 A * | 10/1940 | Messerschmitt ...... B64C 21/025 244/209 |
| 2,223,744 A | 12/1940 | Stalker |
| 2,225,525 A | 12/1940 | Pitcairn |
| 2,267,927 A | 12/1941 | Kightlinger |
| 2,352,144 A | 6/1944 | Woods |
| 2,406,918 A | 9/1946 | Stalker |
| 2,421,694 A | 6/1947 | Hawkins |
| 2,427,972 A | 9/1947 | Melchior |
| 2,438,942 A | 4/1948 | Polk |
| 2,464,726 A | 3/1949 | Stalker |
| 2,469,902 A | 5/1949 | Stalker |
| 2,478,793 A | 8/1949 | Trey |
| 2,507,611 A | 5/1950 | Pappas et al. |
| 2,511,504 A | 6/1950 | Hawkins |
| 2,514,513 A | 7/1950 | Price |
| 2,584,666 A | 2/1952 | Bockrath |
| 2,597,769 A | 5/1952 | Ashkenas |
| 2,605,983 A | 8/1952 | Stalker |
| 2,619,302 A | 11/1952 | Loedding |
| 2,714,495 A | 8/1955 | Focke |
| 2,809,793 A | 10/1957 | Warner |
| 2,892,582 A | 6/1959 | O'Rourke |
| 2,910,254 A | 10/1959 | Razak |
| 2,946,541 A | 7/1960 | Boyd |
| 3,029,043 A | 4/1962 | Churchill |
| 3,029,044 A | 4/1962 | Childress |
| 3,039,719 A | 6/1962 | Platt |
| 3,045,947 A | 7/1962 | Bertin et al. |
| 3,055,614 A | 9/1962 | Thompson |
| 3,097,817 A | 7/1963 | Towzey, Jr. |
| 3,101,678 A | 8/1963 | Grube |
| 3,128,063 A | 4/1964 | Kaplan |
| 3,144,220 A | 8/1964 | Kittelson |
| 3,161,377 A | 12/1964 | Balluff |
| 3,261,576 A | 7/1966 | Valyi |
| 3,262,658 A | 7/1966 | Reilly |
| 3,291,420 A | 12/1966 | Laing |
| 3,298,636 A | 1/1967 | Arnholdt |
| 3,430,894 A | 3/1969 | Strand et al. |
| 3,438,599 A | 4/1969 | Welzen |
| 3,441,236 A | 4/1969 | Arnholdt |
| 3,506,220 A | 4/1970 | Sbrilli |
| 3,507,463 A | 4/1970 | Kuntz |
| 3,540,681 A | 11/1970 | Orazi |
| 3,545,701 A | 12/1970 | Bertin et al. |
| 3,572,612 A | 3/1971 | Irbitis |
| 3,576,300 A | 4/1971 | Palfreyman |
| 3,586,267 A | 6/1971 | Ingelman-Sundberg |
| 3,658,279 A | 4/1972 | Robertson |
| 3,666,209 A | 5/1972 | Taylor |
| 3,807,663 A | 4/1974 | Bartoe, Jr. |
| 3,887,146 A | 6/1975 | Bright |
| 3,917,193 A | 11/1975 | Runnels, Jr. |
| 3,977,629 A | 8/1976 | Tubeuf |
| 4,033,526 A | 7/1977 | Benson |
| 4,086,022 A | 4/1978 | Freeman et al. |
| 4,117,995 A | 11/1978 | Runge |
| 4,375,937 A | 3/1983 | Cooper |
| 4,381,091 A | 4/1983 | Pegram |
| 4,391,424 A | 7/1983 | Bartoe, Jr. |
| 4,398,683 A | 8/1983 | Schmetzer |
| 4,398,688 A | 8/1983 | Williams |
| 4,804,155 A | 2/1989 | Strumbos |
| 4,828,203 A | 5/1989 | Clifton et al. |
| 4,848,701 A | 7/1989 | Belloso |
| 4,928,907 A | 5/1990 | Zuck |
| 4,976,349 A | 12/1990 | Adkins |
| 4,990,053 A | 2/1991 | Rohne |
| 5,016,837 A | 5/1991 | Willis |
| 3,011,762 A | 12/1991 | Pouit |
| 5,098,034 A | 3/1992 | Lendriet |
| 5,255,881 A | 10/1993 | Rao |
| 5,280,863 A | 1/1994 | Schmittle |
| 5,282,718 A | 2/1994 | Koff et al. |
| 5,335,885 A | 8/1994 | Bohning |
| 5,395,073 A | 3/1995 | Rutan et al. |
| 5,474,417 A | 12/1995 | Privett et al. |
| 5,542,149 A | 8/1996 | Yu |
| 5,586,859 A | 12/1996 | Nolcheff |
| 5,607,284 A | 3/1997 | Byrne et al. |
| 5,687,934 A | 11/1997 | Owens |
| 5,707,206 A | 1/1998 | Goto et al. |
| 5,765,777 A | 6/1998 | Schmittle |
| 5,769,359 A | 6/1998 | Rutan et al. |
| 5,899,416 A | 5/1999 | Meister et al. |
| 6,089,503 A | 7/2000 | Volk |
| 6,220,012 B1 | 4/2001 | Hauser et al. |
| 6,231,301 B1 | 5/2001 | Barnett et al. |
| 6,264,425 B1 | 7/2001 | Keller |
| 6,368,059 B1 | 4/2002 | Maines |
| 6,464,171 B2 | 10/2002 | Ruffin |
| 6,543,720 B2 | 4/2003 | Ladd |
| 6,669,142 B2 | 12/2003 | Saiz |
| 6,796,533 B2 | 9/2004 | Barrett et al. |
| 6,896,221 B1 | 5/2005 | Einarsson |
| 6,935,833 B2 | 8/2005 | Seitz |
| 7,074,006 B1 | 7/2006 | Hathaway et al. |
| 7,104,143 B1 | 9/2006 | Powell |
| 7,143,983 B2 | 12/2006 | McClure |
| 7,308,762 B2 | 12/2007 | Bath et al. |
| 7,441,724 B2 | 10/2008 | Parks |
| 7,520,465 B2 | 4/2009 | Mahjoub |
| 7,575,412 B2 | 8/2009 | Seitz |
| 7,673,832 B2 | 3/2010 | Meister |
| 7,837,438 B2 | 11/2010 | Campbell |
| 7,878,458 B2 | 2/2011 | Shmilovich et al. |
| 8,128,037 B2 | 3/2012 | Powell et al. |
| 8,128,364 B2 | 3/2012 | Pesetsky |
| 8,191,820 B1 | 6/2012 | Westra et al. |
| 8,245,976 B2 * | 8/2012 | Sakurai ................. B64C 21/02 244/129.5 |
| 8,246,311 B2 | 8/2012 | Pesetsky |
| 8,251,317 B2 | 8/2012 | Pitt |
| 8,251,319 B2 | 8/2012 | Jonker et al. |
| 8,262,031 B2 | 9/2012 | Zha et al. |
| 8,302,903 B2 | 11/2012 | Morgan et al. |
| 8,448,892 B2 | 5/2013 | Zhu |
| 8,459,597 B2 | 6/2013 | Cloft et al. |
| 8,469,907 B2 | 6/2013 | Ichihashi et al. |
| 8,485,476 B2 | 7/2013 | Zha et al. |
| 8,561,935 B2 | 10/2013 | Milde, Jr. |
| 8,829,706 B1 | 9/2014 | Sammy |
| 9,115,594 B2 | 8/2015 | Krautheim |
| 9,726,084 B2 | 8/2017 | Duong et al. |
| 9,815,545 B1 | 11/2017 | Steer |
| 10,106,246 B2 * | 10/2018 | Zha ........................ B64C 3/141 |
| 10,252,789 B2 * | 4/2019 | Zha ........................ B64C 21/025 |
| 10,315,754 B2 * | 6/2019 | Zha ........................ B64C 21/08 |

(56) References Cited

U.S. PATENT DOCUMENTS

| | | | |
|---|---|---|---|
| 10,683,076 B2* | 6/2020 | Zha | B64C 21/025 |
| 10,683,077 B2* | 6/2020 | Zha | B64C 3/141 |
| 11,034,430 B2* | 6/2021 | Zha | B64C 3/36 |
| 2002/0139894 A1 | 10/2002 | Sorensen | |
| 2003/0035715 A1 | 2/2003 | Torrance | |
| 2003/0150962 A1 | 8/2003 | Orban | |
| 2005/0111968 A1 | 5/2005 | Lapworth | |
| 2005/0226717 A1 | 10/2005 | Xu | |
| 2006/0196633 A1 | 9/2006 | Mahjoub | |
| 2007/0095970 A1 | 5/2007 | Richardson | |
| 2007/0196204 A1 | 8/2007 | Seitz | |
| 2007/0217902 A1 | 9/2007 | Sirakov et al. | |
| 2007/0228222 A1 | 10/2007 | Davis | |
| 2008/0044273 A1 | 2/2008 | Khalid | |
| 2009/0014592 A1 | 1/2009 | Zha | |
| 2009/0065631 A1 | 3/2009 | Zha | |
| 2009/0095446 A1 | 4/2009 | Hamstra et al. | |
| 2009/0108141 A1 | 4/2009 | Shmilovich | |
| 2009/0173834 A1 | 7/2009 | Prince et al. | |
| 2010/0127129 A1 | 5/2010 | Zha et al. | |
| 2011/0001000 A1 | 1/2011 | Zhu | |
| 2011/0001020 A1 | 1/2011 | Forgac | |
| 2011/0210211 A1 | 9/2011 | Zha et al. | |
| 2011/0215172 A1 | 9/2011 | Todorovic | |
| 2012/0043428 A1 | 2/2012 | Goelling et al. | |
| 2012/0068020 A1 | 3/2012 | Milde, Jr. | |
| 2012/0074264 A1 | 3/2012 | Heaton | |
| 2012/0145834 A1 | 6/2012 | Morgan et al. | |
| 2012/0237341 A1 | 9/2012 | Simon | |
| 2013/0206920 A1 | 8/2013 | Bichler et al. | |
| 2014/0286746 A1 | 9/2014 | Nicholas et al. | |
| 2014/0369812 A1 | 12/2014 | Caruel et al. | |
| 2016/0009374 A1 | 1/2016 | Glezer | |
| 2016/0368339 A1 | 12/2016 | Nam | |
| 2017/0355450 A1 | 12/2017 | Zha | |
| 2017/0355451 A1 | 12/2017 | Zha | |
| 2018/0251211 A1 | 9/2018 | Zha | |
| 2019/0389588 A1* | 12/2019 | Zha | B64D 15/04 |

FOREIGN PATENT DOCUMENTS

| | | |
|---|---|---|
| DE | 202011051844 U1 | 1/2012 |
| EP | 3254961 | 12/2017 |

OTHER PUBLICATIONS

World Intellectual Property Organization, English Translation of CN 104176241, retrieved from Internet Oct. 2, 2019, pp. 1-7.
European Patent Office, Extended European Search Report for Application No. 17175582.0, dated Nov. 9, 2017, pp. 1-5.
Espacenet, Patent Translate of DF202011051844, pp. 1-9, retrieved from Internet Apr. 11, 2018.
European Patent Office, Extended European Search Report for Application No. 18202156.8, dated Apr. 2, 2019, pp. 1-11.
European Patent Office. "Extended European Search Report" for EP application No. 19181825.1, dated Oct. 30, 2019, pp. 1-7.

* cited by examiner

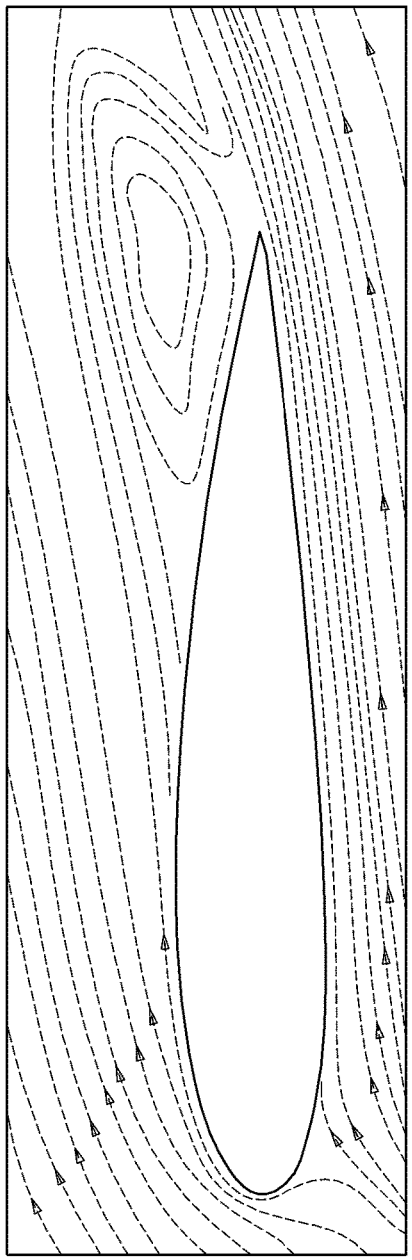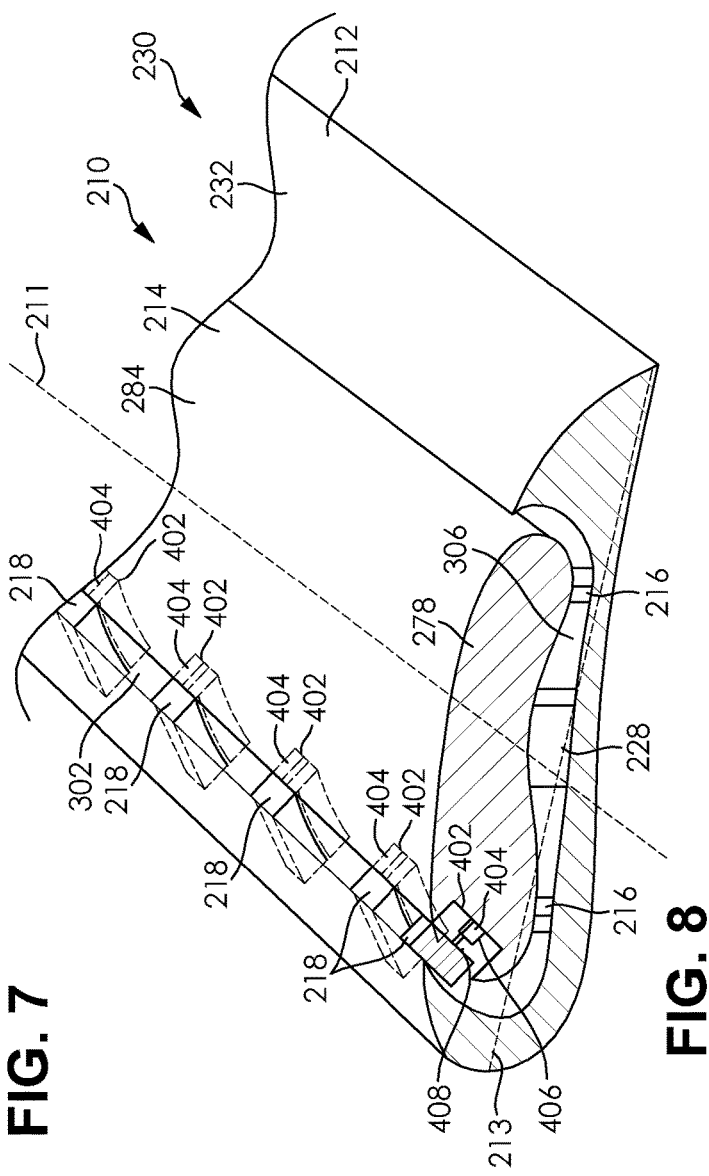
FIG. 7
FIG. 8

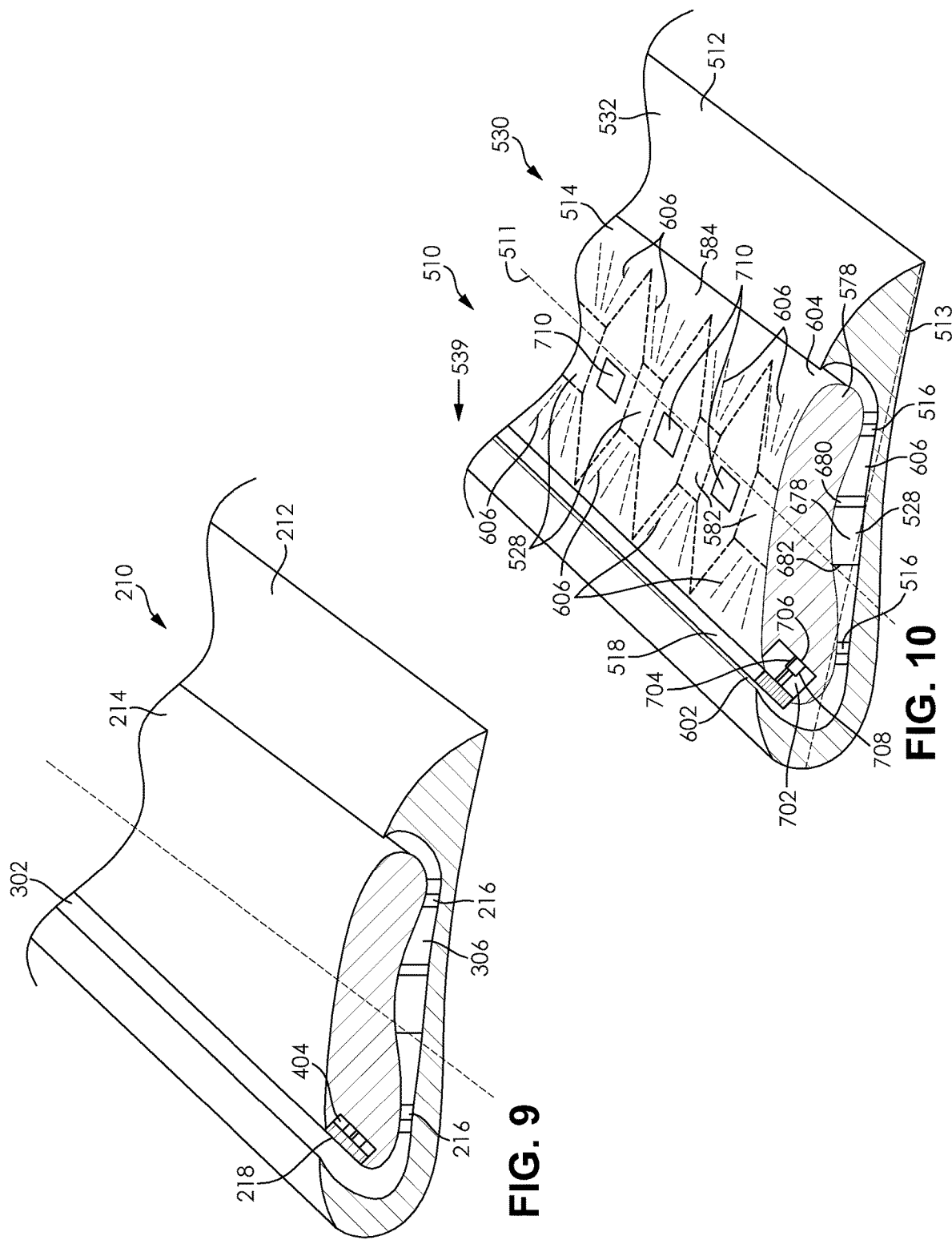

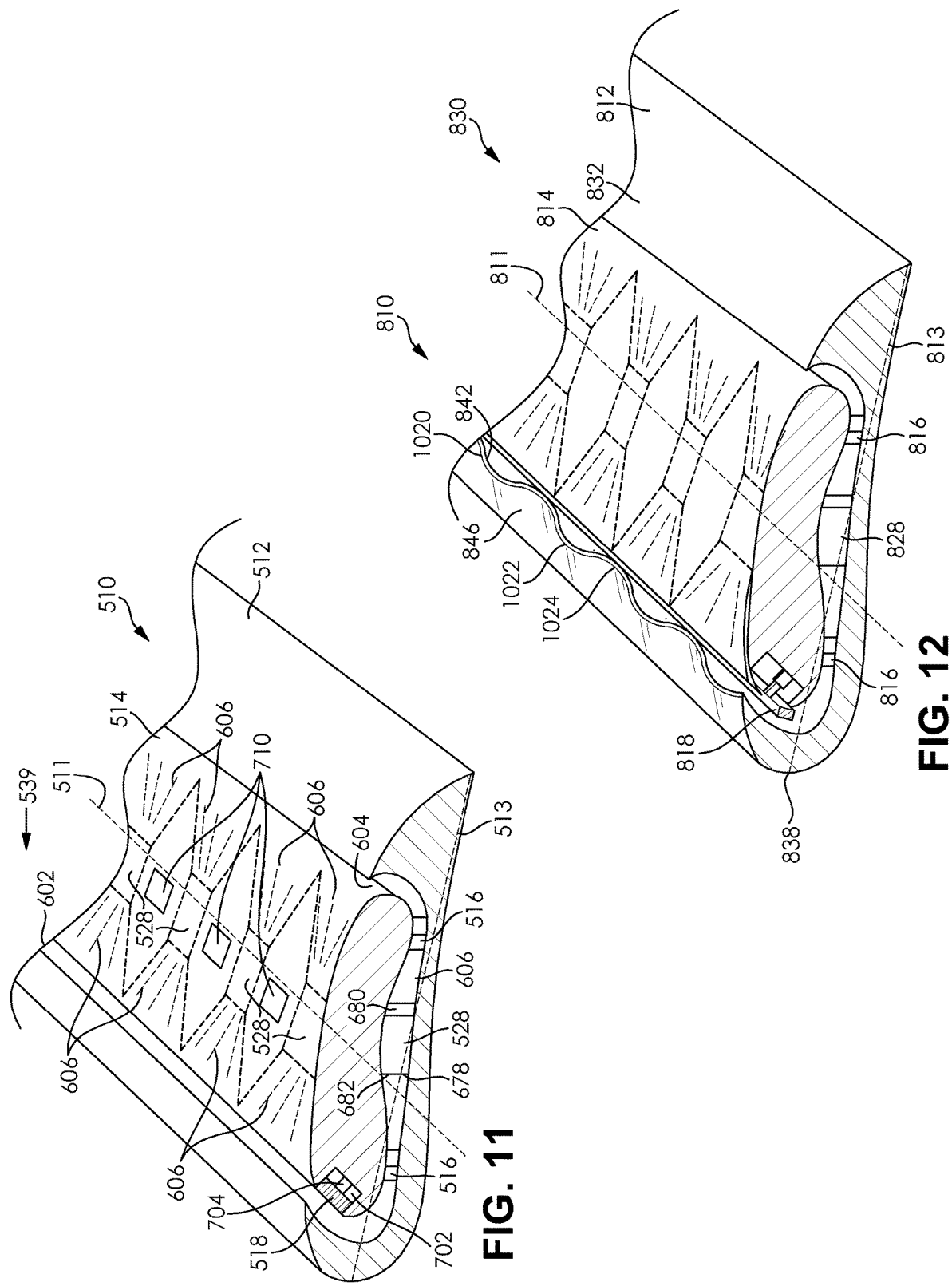

FLUID SYSTEMS THAT INCLUDE A CO-FLOW JET

RELATED APPLICATIONS

This application is a continuation of U.S. Nonprovisional application Ser. No. 15/426,084, filed Feb. 7, 2017, which is a continuation-in-part of U.S. Nonprovisional application Ser. No. 15/255,523, filed Sep. 2, 2016, which claims the benefit of U.S. Provisional Application No. 62/348,344, filed on Jun. 10, 2016. The entire disclosure of each of these related applications is hereby incorporated into this disclosure by reference.

FIELD

The disclosure relates generally to the field of fluid systems. More particularly, the disclosure relates to fluid systems that include a co-flow jet.

BACKGROUND

Transportation vehicles, such as aircraft, have traditionally made use of propellers or jet engine propulsion systems to generate thrust and wings to generate lift to support the weight of the aircraft. Generally, the propulsion and lift-generating systems have been addressed as separate systems. Some airfoil systems have been developed that combine these systems utilizing a conduit that is in communication with outlet and inlet openings defined on the wing of the aircraft. However, these systems do not address the potential for debris to enter into the conduit and reduce the efficiency and effectiveness of the system. In addition, these systems do not provide alternatives for altering the fluid flow through the conduit to achieve greater propulsion and/or lift.

Therefore, a need exists for new and useful fluid systems.

SUMMARY OF SELECTED EXAMPLE EMBODIMENTS

Various fluid systems are described herein.

An example fluid system includes a fuselage, a wing box, a first wing, a first panel, a first actuator, a second panel, and a second actuator. The fuselage has a front end, a rear end, and a main body that defines a recess between the front end and the rear end. The wing box is rotatably attached to the main body of the fuselage such that the wing box is moveable relative to the fuselage. The wing box is disposed within the recess defined by the main body of the fuselage and has a main body. The first wing is attached to the main body of the wing box and has a first body portion and a second body portion. The first body portion has a leading edge, a trailing edge, a first intermediate edge, a second intermediate edge, a front surface, a rear surface, a bottom surface, and a main body defining a recess, an inner surface, a recess base, a first opening, a second opening, a third opening, and a cavity. The first intermediate edge is disposed between the leading edge and the second intermediate edge. The second intermediate edge disposed between the first intermediate edge and the trailing edge. The front surface extends from the leading edge to the first intermediate edge. The rear surface extends from the trailing edge to the second intermediate edge. The bottom surface extends from the leading edge to the trailing edge. The recess extends into the main body of the first body portion from the first opening to the recess base and forms the inner surface. The first opening extends from the first intermediate edge to the second intermediate edge. The second opening is defined on the inner surface and provides access to the cavity. The third opening provides access to the cavity. The second body portion is disposed within the recess defined by the main body of the first body portion. The first body portion and the second body portion cooperatively define an injection opening, a suction opening, and a channel that extends from the injection opening to the suction opening. The first panel is moveably attached to the first body portion and is moveable between an open configuration in which fluid can flow through the third opening and a closed configuration in which fluid is prevented from flowing through the third opening. The first actuator is operatively attached to the first panel and is configured to move the first panel between the open configuration and the closed configuration. The second panel is moveably attached to the first body portion and is moveable between an open configuration in which fluid can flow through the second opening and a closed configuration in which fluid is prevented from flowing through the second opening. The second actuator is operatively attached to the second panel and is configured to move the second panel between the open configuration and the closed configuration. The second opening provides access between the channel and the cavity. The third opening provides access between the cavity and an environment exterior to the first body portion.

Additional understanding of the exemplary fluid systems can be obtained by review of the detailed description, below, and the appended drawings.

BRIEF DESCRIPTION OF THE DRAWINGS

FIG. 7 is a side view of a conventional airfoil subjected to a fluid flow field.

FIG. 8 is a partial perspective cross-sectional view of a second example fluid system taken along a plane that is orthogonal to the lengthwise axis of the fluid system. The discrete spacers are illustrated in a first configuration.

FIG. 9 illustrates the discrete spacers of the fluid system illustrated in FIG. 8 in a second configuration.

FIG. 10 is a partial perspective cross-sectional view of a third example fluid system taken along a plane that is orthogonal to the lengthwise axis of the fluid system. The spacer is illustrated in a first configuration.

FIG. 11 illustrates the spacer of the fluid system illustrated in FIG. 10 in a second configuration.

FIG. 12 is a partial perspective cross-sectional view of a fourth example fluid system taken along a plane that is orthogonal to the lengthwise axis of the fluid system.

DETAILED DESCRIPTION

Figure 1:
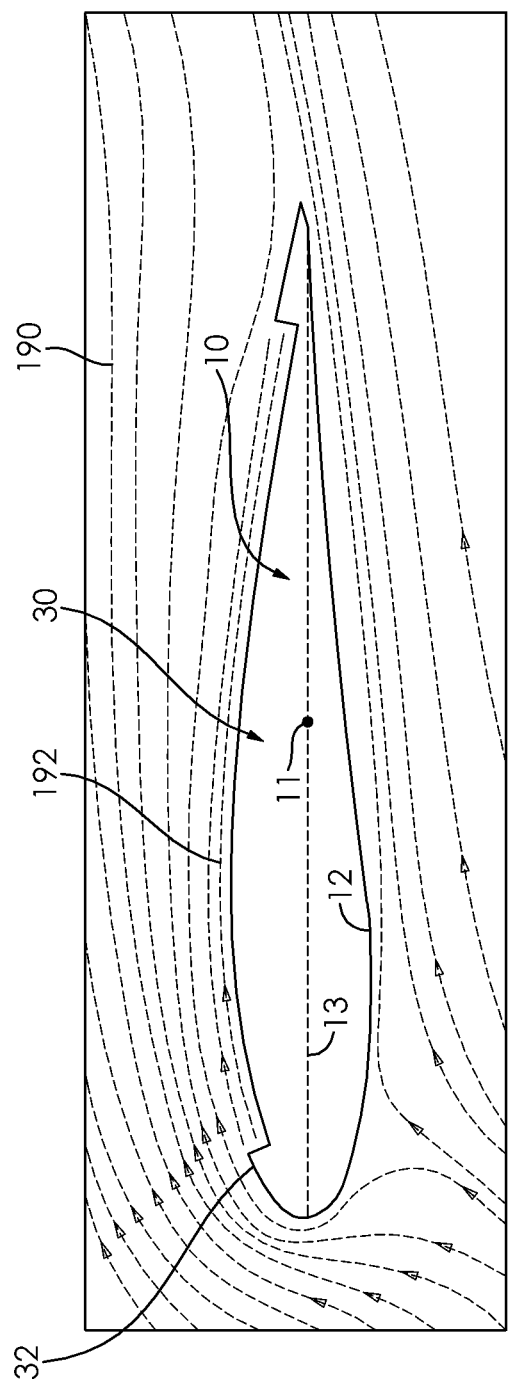
FIG. 1 is a side view of a first example fluid system subjected to a fluid flow field.

The following detailed description and the appended drawings describe and illustrate various example embodiments of fluid systems. The description and illustration of these examples are provided to enable one skilled in the art to make and use a fluid system. They are not intended to limit the scope of the claims in any manner.

As used herein, the term "debris" refers to any material that is sized and configured to pass through an injection opening or suction opening and can include raindrops, sand, snow, and/or any other material.

As used herein, the phrase "chord length" refers to the length extending from the leading edge of an element to the trailing edge of the element. The phrase "chord length" does not limit the structural configuration of the element and can be used to describe the length of any element.

FIGS. 1, 2, 3, 4, 5, and 6 illustrate a first example fluid system 10. The fluid system 10 has a lengthwise axis 11, a first body portion 12, a chord length 13, a second body portion 14, a plurality of supports 16, a plurality of spacers 18, a first panel 20, a first actuator 22, a second panel 24, a second actuator 26, and a fluid pressurizer 28. In the illustrated embodiment, the fluid system 10 is included on the airfoil 30 of a wing 32 of an aircraft.

The first body portion 12 has a leading edge 38, a trailing edge 40, a first intermediate edge 42, a second intermediate edge 44, a front surface 46, a rear surface 48, a bottom surface 50, and a main body 52 that defines a recess 54, an inner surface 56, a first opening 58, a second opening 60, a third opening 62, and a cavity 64. The chord length 13 extends from the leading edge 38 to the trailing edge 40 along a hypothetical plane. The leading edge 38 is the portion of the first body portion 12 (e.g., the front of the first body portion 12) that interacts with fluid first when the fluid system 10 is traveling through a fluid in a forward direction (e.g., in the direction indicated by arrow 39). The trailing edge 40 is the portion of the first body portion 12 (e.g., the rear of the first body portion 12) that interacts with fluid last when the fluid system 10 is traveling through a fluid in a forward direction (e.g., in the direction indicated by arrow 39).

Figure 2:
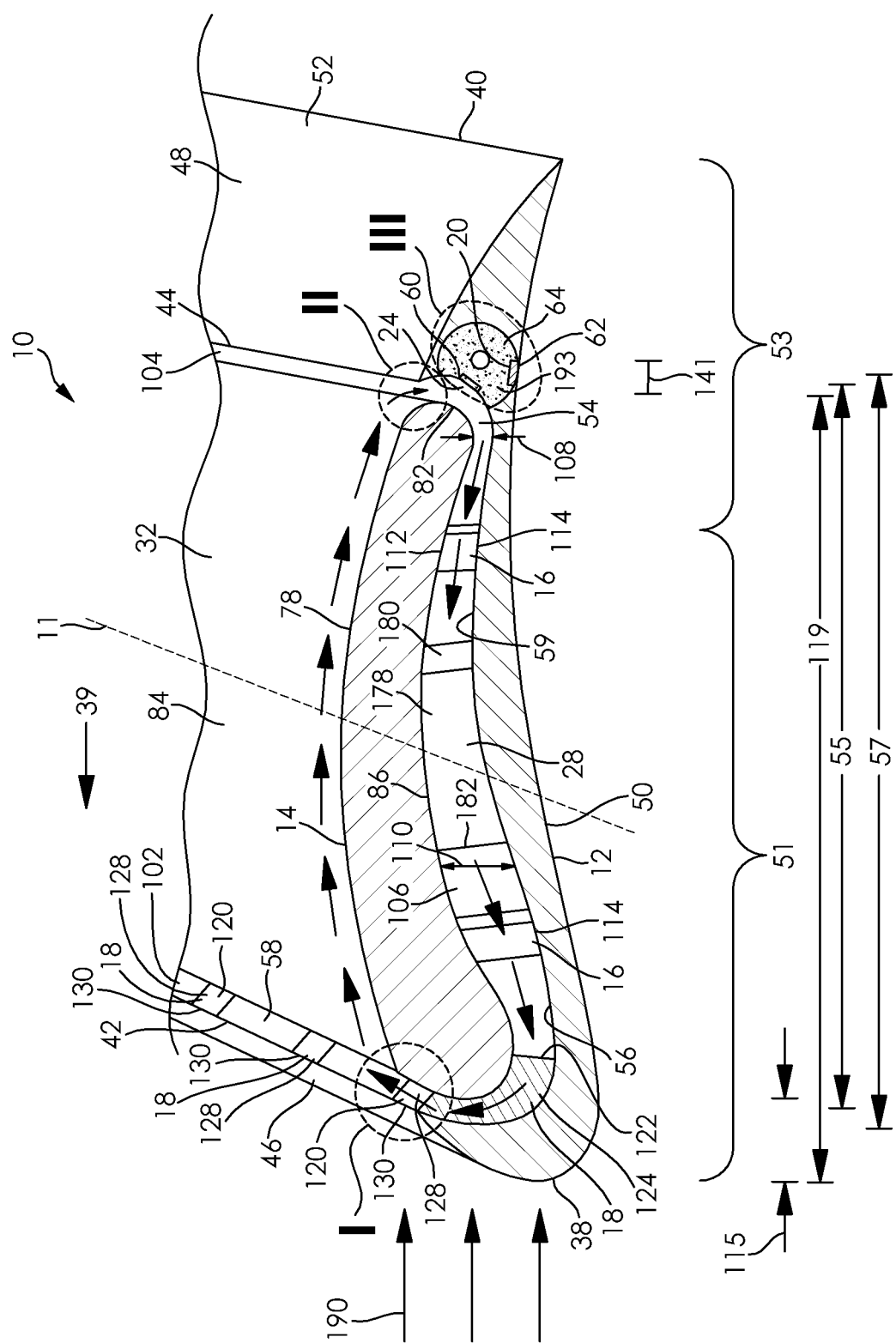
FIG. 2 is a partial perspective cross-sectional view of the fluid system illustrated in FIG. 1 taken along a plane that is orthogonal to the lengthwise axis of the fluid system.

The first intermediate edge 42 is disposed between the leading edge 38 and the trailing edge 40 and the second intermediate edge 44 is disposed between the first intermediate edge 42 and the trailing edge 40. The first intermediate edge 42 and the second intermediate edge 44 define the first opening 58. The front surface 46 extends from the leading edge 38 toward the trailing edge 40 to the first intermediate edge 42 and curves away from the chord length 13. The rear surface 48 extends from the second intermediate edge 44 away from the leading edge 38 to the trailing edge 40 and curves toward the chord length 13. The bottom surface 50 extends from the leading edge 38 to the trailing edge 40 and extends toward the chord length 13 along a first portion 51 of the bottom surface 50 and away from the chord length 13 along a second portion 53 of the bottom surface 50, as shown in FIG. 2.

The recess 54 extends into the main body 52 between the leading edge 38 and the trailing edge 40 (e.g., between the front surface 46 and the rear surface 48), from the first opening 58, and toward the bottom surface 50 to a recess base 59. The recess 54 is sized and configured to receive the second body portion 14 (a portion of the second body portion 14, the entirety of the second body portion 14), as described in more detail herein. The recess 54 has a first width 55 between the first intermediate edge 42 and the second intermediate edge 44 and a second width 57 between the first opening 58 and the recess base 59. The first width 55 is measured along a first hypothetical line that extends from the first intermediate edge 42 to the second intermediate edge 44. The second width 57 is measured along a second hypothetical line that is different than, and disposed parallel to, the first hypothetical line and extends across the recess 54. The second width 57 is greater than the first width 55.

Figure 4:
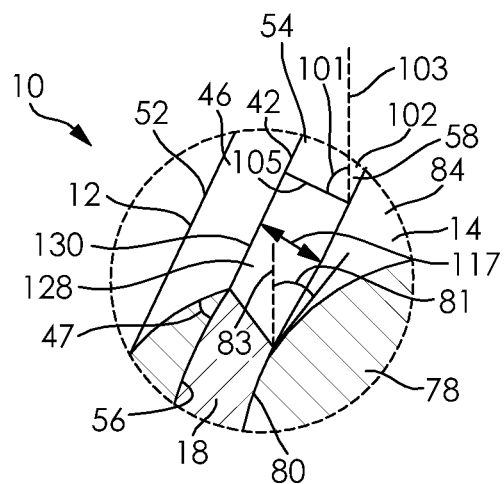
FIG. 4 is a magnified view of area I illustrated in FIG. 2.
Figure 5:
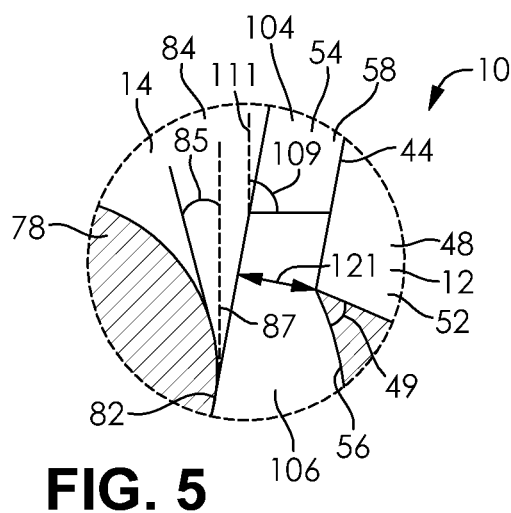
FIG. 5 is a magnified view of area II illustrated in FIG. 2.

As shown in FIG. 4, a portion of the front surface 46 that extends from the first intermediate edge 42 toward the leading edge 38 is disposed at an angle 47 to the inner surface 56 that defines the recess 54. In the illustrated embodiment, the angle 47 is less than 90 degrees. As shown in FIG. 5, a portion of the rear surface 48 that extends from the second intermediate edge 44 toward the trailing edge 40 is disposed at an angle 49 to the inner surface 56 that defines the recess 54. In the illustrated embodiment, the angle 47 is less than 90 degrees.

While a portion of the front surface 46 and a portion of the rear surface 48 have been described as being disposed at angles less than 90 degrees relative to the inner surface 56, a portion of the front surface and/or a portion of a rear surface can be disposed at any suitable angle relative to an inner surface of a fluid system. Selection of a suitable angle to position a portion of a front surface and/or a portion of a rear surface can be based on various considerations, such as the desired fluid flow around, or through, a fluid system. Example angles considered suitable to position a portion of a front surface and/or a portion of a rear surface of a first body portion relative to an inner surface include angles less than 90 degrees, angles less than 45 degrees, and any other angle considered suitable for a particular embodiment.

The second opening 60 is disposed on a portion of a curved surface of the inner surface 56 within recess 54, between the rear surface 48 and the bottom surface 50, and provides access between the channel 106, as described in more detail herein, and the cavity 64. The third opening 62 is disposed on the bottom surface 50 and provides access between the cavity 64 and an environment exterior to the first body portion 12. The cavity 64 is disposed between the rear surface 48 and the bottom surface 50 and is sized and configured to receive fluid that travels into channel 106, as described in more detail herein, and debris that enters into the channel 106 during movement of the fluid system 10 through fluid. In the illustrated embodiment, the cavity 64 has an oval cross-sectional configuration that advantageously allows debris to accumulate within the cavity 64 during movement of the fluid system 10 through fluid when the second opening 60 is open and the third opening 62 is closed. Debris (e.g., water and/or sand) accumulates in the cavity 64 because it has a higher density than the fluid (e.g., air) through which it is travelling and higher centrifugal forces will be applied to the debris based on the structural arrangement (e.g., curved, non-linear structural arrangement) of the first body portion 12 and the second body portion 14 and the structural arrangement of the channel 106 (e.g., the channel 106 curves from the suction opening 104 toward the injection opening 102 at angle between about 10 degrees and about 180 degrees). While the fluid system 10 has been described as a wing 32 of an aircraft travelling through air, a fluid system can travel through any suitable fluid and debris can be any debris that is disposed within the fluid.

While the cavity 64 has been illustrated as having an oval cross-sectional configuration, a cavity can have any suitable cross-sectional configuration and selection of a suitable cross-sectional configuration for a cavity according to a particular embodiment can be based on various considerations, including the desired flow patterns within a cavity when fluid and/or debris travels into the cavity. Example cross-sectional configurations considered suitable include oval, circular, curved, partially curved, triangular, square, rectangular, and any other cross-sectional configuration considered suitable for a particular embodiment.

Maintaining the position of a panel, such as the first panel 20 and the second panel 24, as described in more detail herein, during use can be accomplished using any suitable structure having any suitable structural arrangement that is capable of maintaining the position of a panel and allowing axial movement of the panel along an axis. Selection of a suitable structure can be based on various considerations, such as the structural arrangement of a panel included in a fluid system, the structural arrangement of a first body portion, and/or the structural arrangement of a second body portion. Examples of structures considered suitable to include in a fluid system to maintain the position of a panel and allow axial movement of the panel along an axis include brackets, rails, recessed grooves, tracks, and any other structure considered suitable for a particular embodiment.

Figure 6:
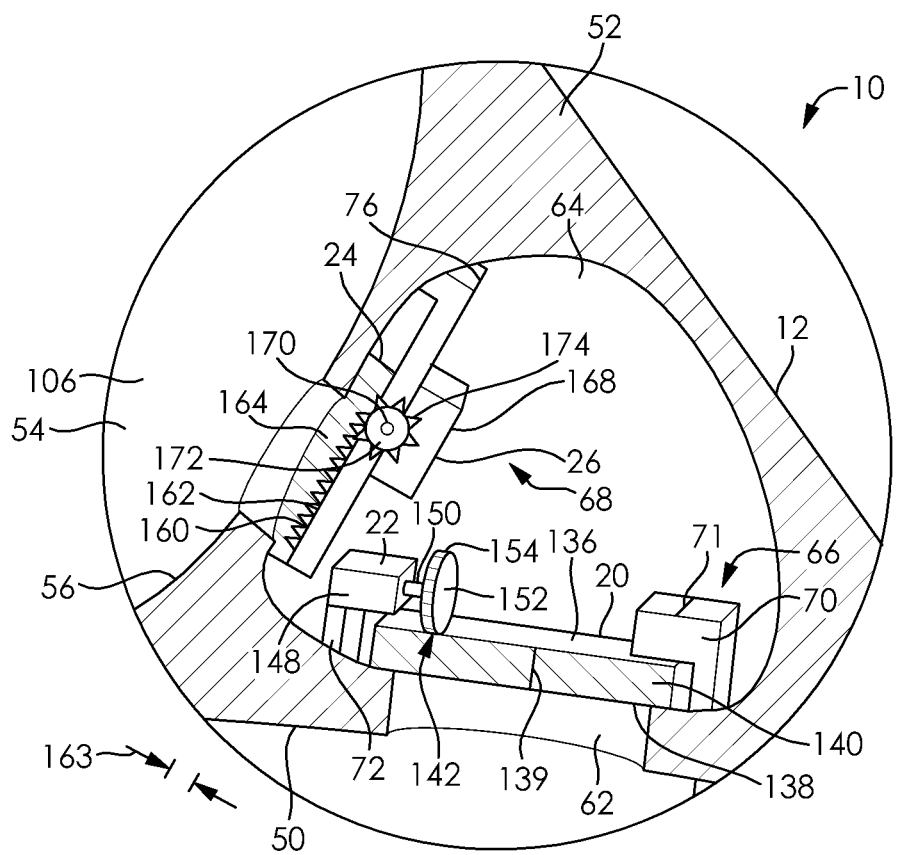
FIG. 6 is a magnified view of area III illustrated in FIG. 2.

As shown in FIG. 6, in the illustrated embodiment, the first body portion 12 includes a first track 66 and a second track 68 that are each sized and configured to maintain the position of a panel and allow axial movement of the panel along an axis. The first track 66 has a first track first rail 70 and a first track second rail 72 and the second track 68 has a second track first rail (not illustrated) and a second track second rail 76. In the illustrated embodiment, the second track first rail has a configuration that mirrors that of the second track second rail 76. Each of the first track first rail 70 and first track second rail 72 has a length 71 that is greater than the length 141 of the first panel 20 and that extends along the length of the third opening 62. Each of the second track first rail and second track second rail 76 has a length 75 that is greater than the length 165 of the second panel 24 and that extends along the length of the second opening 60. The first track 66 is sized and configured relative to the first body portion 12 to receive a portion of the first panel 20 and the second track 68 is sized and configured relative to the first body portion 12 to receive a portion of the second panel 24.

Each of the first track 66 (e.g., first track first rail 70, first track second rail 72) and second track 68 (e.g., second track first rail, second track first rail 76) can be attached to the first body portion 12 using any suitable technique or method of attachment. Alternatively, a second track can be attached to both a first body portion and a second body portion, or to only a second body portion, and positioned such that a second panel can move between open and closed configurations relative to a second opening. Selection of a suitable technique or method of attachment between a track and a first body portion and/or second body portion according to a particular embodiment can be based on various considerations, including the material(s) that forms the track, the first body portion, and/or the second body portion. Example techniques and methods of attachment considered suitable include welding, fusing, using adhesives, mechanical connectors, and/or forming the first body portion, second body portion, and each track (e.g., rail) as an integrated component. In the illustrated embodiment, each of the first track 66 and second track 68 is a separate element welded to the first body portion 12.

The second body portion 14 is disposed within the recess 54 defined by the first body portion 12 and has a main body 78, a front edge 80, a rear edge 82, a top surface 84, and a bottom surface 86. The top surface 84 extends from the front edge 80 to the rear edge 82 and extends away from the chord length 13 along a first portion of the top surface 84 that extends from the front edge 80 toward the rear edge 82 and extends toward from the chord length 13 along a second portion of the top surface 84 that extends from the rear edge 82 toward the front edge 80. The bottom surface 86 extends from the front edge 80 to the rear edge 82 and extends away from the chord length 13 along a first portion of the bottom surface 86 that extends from the front edge 80 toward the rear edge 82 and extends toward from the chord length 13 along a second portion of the bottom surface 86 that extends from the rear edge 82 toward the front edge 82.

As shown in FIG. 4, a portion of the top surface 84 that extends from the front edge 80 toward the rear edge 82 is disposed at an angle 81 to a first axis 83 that is disposed orthogonally to the chord length 13. In the illustrated embodiment, the angle 81 is less than 90 degrees. As shown in FIG. 5, a portion of the top surface 84 that extends from the rear edge 82 and toward the front edge 80 is disposed at an angle 85 to a second axis 87 that is disposed orthogonally to the chord length 13. In the illustrated embodiment, the angle 85 is less than 90 degrees.

While portions of the top surface 84 have been described as being disposed at angles less than 90 degrees relative to axes that are disposed orthogonally to the chord length 13, a portion of the top surface of a second body portion can be disposed at any suitable angle relative to an axis that is disposed orthogonally to the chord length. Selection of a suitable angle to position a portion of a top surface can be based on various considerations, such as the desired fluid flow around, or through, a fluid system. Example angles considered suitable to position a portion of a top surface of a second body portion relative to an axis that is disposed orthogonally to the chord length include angles less than 90 degrees, angles less than 45 degrees, and any other angle considered suitable for a particular embodiment.

While the first body portion 12 and second body portion 14 have been illustrated as having a particular structural arrangement and as being separate structures attached to one another, a first body portion and second body portion can have any suitable structural arrangement and be attached to one another using any suitable technique or method of attachment. Selection of a suitable structural arrangement for a first body portion and/or second body portion and of a suitable technique or method of attachment according to a particular embodiment can be based on various considerations, such as the desired fluid flow through a, channel cooperatively defined by a first body portion and second body portion. For example, alternative to positioning the top surface of a second body portion such that it is disposed between a hypothetical surface that extends from the front surface to the rear surface of a first body portion and the bottom surface of the first body portion, the top surface of a second body portion can be positioned such that it is partially disposed on a hypothetical surface that extends from the front surface to the rear surface of a first body portion, or such that it is disposed outside of the space between a hypothetical surface that extends from the front surface to the rear surface of a first body portion and the bottom surface of the first body portion. Example techniques and methods of attachment considered suitable between a first body portion and a second body portion include welding, fusing, using adhesives, mechanical connectors, and/or forming a first body portion and a second body portion as an integrated component. In the illustrated embodiment, the first body portion 12 is attached to the second body portion 14 by welding the supports 16 to each of the first body portion 12 and the second body portion 14, as described in more detail herein.

In the illustrated embodiment, the first body portion 12 and the second body portion 14 cooperatively define an injection opening 102, a suction opening 104, and a channel 106. The first intermediate edge 42 and the second body portion 14 cooperatively define the injection opening 102. The second intermediate edge 44 and the second body portion 14 cooperatively define the suction opening 104. The injection opening 102 is disposed between the leading edge 38 and the suction opening 104 and the suction opening 104 is disposed between the injection opening 102 and the trailing edge 40 such that the injection opening 102 is disposed upstream from the suction opening 104 when the fluid system 10 is traveling in a forward direction, shown by arrow 39. The channel 106 extends from the injection opening 102 to the suction opening 104 such that the injection opening 102 is in communication with the suction opening 104. During movement of the fluid system 10 in a forward direction, as shown by arrow 39, fluid exterior to the fluid system 10 flows into the channel 106 from the suction opening 104, through the channel 106, and exits at the injection opening 102. As shown in FIG. 6, the second opening 60 and the cavity 64 defined by the first body portion 12 are positioned on the first body portion 12 such that fluid that travels through the suction opening 104 and into the channel 106 toward the trailing edge 40 encounters the second opening 60 and the cavity 64 when the second panel 24 is in the open configuration and before the fluid changes its direction of travel toward the injection opening 102 along the path of the channel 106. Alternative to including a recess on a first body portion, a first body portion and a second body portion can cooperatively define a channel in embodiments in which the first body portion and the second body portion are integrated elements.

In the illustrated embodiment, the channel 106 has a first depth 108 and a second depth 110 that is greater than the first depth 108. Each of the first depth 108 and second depth 110 extends from the first body portion 12 to the second body portion 14 and is measured along a hypothetical plane that is disposed orthogonally to the chord length 13 of the fluid system 10. While the channel 106 has been illustrated as having a particular structural configuration and a depth that varies along the length of the channel 106, a channel can have any suitable structural configuration and selection of a suitable structural configuration for a channel can be based on various considerations, such as the desired fluid flow through the channel. For example, the depth of a channel can be constant along a portion, or the entirety, of its length or vary along a portion, or the entirety, of its length. Examples of cross-sectional configurations considered suitable for a channel include circular cross-sectional configurations, rectangular cross-sectional configurations, oval cross-sectional configurations, hexagonal cross-sectional configurations, multi-faceted cross-sectional configurations, and any other cross-sectional configuration considered suitable for a particular embodiment.

In the illustrated embodiment, the injection opening 102 is positioned relative to the chord length 13 such that an angle 101 is disposed between an axis 103 that is disposed orthogonal to the chord length 13 and a first hypothetical line 105 that extends from the axis 103 and away from the chord length 13. The first hypothetical line 105 extends from the first intermediate edge 42 to the second body portion 14 and is disposed perpendicular to the midline of fluid flow 190 through the injection opening 102, as described in more detail herein, when the fluid system 10 is traveling in a forward direction and/or the fluid pressurizer 28 has been activated. The angle 101 is positive when traveling in a counterclockwise direction relative to the axis 103 and is a negative when traveling in a clockwise direction relative to the axis 103. In the illustrated embodiment, the angle 101 is about 30 degrees.

In the illustrated embodiment, the suction opening 104 is positioned relative to the chord length 13 such that an angle 109 is disposed between an axis 111 that is disposed orthogonal to the chord length 13 and a second hypothetical line 113 that extends from the axis 111 and away from the chord length 13. The second hypothetical line 113 extends from the second intermediate edge 44 to the second body portion 14 and is disposed perpendicular to the midline of fluid flow 190 through the suction opening 104 when the fluid system 10 is traveling in a forward direction and/or the fluid pressurizer 28 has been activated. The angle 109 is positive when traveling in a clockwise direction relative to the axis 111 and is a negative when traveling in a counterclockwise direction relative to the axis 103. In the illustrated embodiment, the angle 109 is about 75 degrees.

In the illustrated embodiment, the injection opening 102 (e.g., center of first hypothetical line 105) is disposed from the leading edge 38 a distance 115 equal to between about 0.1% and about 30% of the chord length 13 and the first hypothetical line 105 has a length 117 equal to between about 0.001% and 5% of the chord length 13. In the illustrated embodiment, the suction opening 104 (e.g., center of second hypothetical line 113) is disposed from the leading edge 38 a distance equal to between about 50% and about 95% of the chord length 13 and the second hypothetical surface 113 has a length 121 equal to between about 0.002% and 10% of the chord length 13.

While the injection opening 102 and the suction opening 104 have been described as being disposed at particular angles relative to the chord length 13, as having particular lengths, and as being disposed at particular distances from the leading edge 38, an injection opening and a suction opening included in a fluid system can be disposed at any suitable angle relative to the chord length, can have any suitable length, and can be disposed at any suitable distance from the leading edge of a first body portion. Selection of a suitable angle to position an injection opening and/or suction opening relative to the chord length, a suitable length for an injection opening and/or suction opening, and/or a suitable distance to position an injection opening and/or suction opening from the leading edge of a first body portion can be based on various considerations, such as the desired fluid flow across, or through, a fluid system. For example, alternative angles that are considered suitable for angle 101 and angle 109 include angles between about 90 degrees (e.g., such that the injection opening 102 is parallel to the chord length 13, such that the suction opening 104 is parallel to the chord length 13) and about −30 degrees, angles between about 50 degrees to about 80 degrees, angles between about 45 degrees and about −15 degrees, angles equal to about 12 degrees, angles equal to about 78 degrees, and any other angle considered suitable for a particular embodiment. Examples of alternative distances considered suitable for distance 115 include distances between about 0.1% and about 30% of the chord length 13, distances equal to about 15% of the chord length 13, and any other distance considered suitable for a particular embodiment. Examples of alternative lengths considered suitable for length 117 include lengths between about 0.001% and 5% of the chord length 13, lengths equal to about 2.5% of the chord length, and any other length considered suitable for a particular embodiment. Examples of alternative distances considered suitable for distance 119 include distances between about 50% and about 95% of the chord length 13, distances equal to about 72.5% of the chord length 13, and any other distance considered suitable for a particular embodiment. Examples of alternative lengths considered suitable for length 121 include lengths between about 0.002% and 10% of the chord length 13, lengths equal to about 5% of the chord length 13, and any other length considered suitable for a particular embodiment.

While the first body portion 12 and second body portion 14 have been illustrated as defining fixed angles at the injection opening 102 and the suction opening 104 (e.g., angle 47, angle 49, angle 81, angle 85, angle 101, angle 109), alternative embodiments can include structure operatively connected to one or more devices, such as an actuator, battery, and/or switch, that provides a mechanism for adjusting the angles described herein (e.g., angle 47, angle 49, angle 81, angle 85, angle 101, angle 109). Including structure that allows for an angle to be manipulated during use is considered advantageous at least because it provides a mechanism for varying the angle at which a jet formed by the injection slot can be positioned relative to the top surface of a second body portion and/or the velocity at which a fluid travels through a channel cooperatively formed between the first body portion and the second body portion.

Each support of the plurality of supports 16 is disposed between the first body portion 12 and the second body portion 14 and has a first end 112 attached to the first body portion 12 and a second end 114 attached to the second body portion 14. Each support of the plurality of supports 16 can be attached to the first body portion 12 and the second body portion 14 using any suitable technique or method of attachment. Selection of a suitable technique or method of attachment between a support and a first body portion and/or second body portion according to a particular embodiment can be based on various considerations, including the material(s) that forms the support, the first body portion, and/or the second body portion. Example techniques and methods of attachment considered suitable include welding, fusing, using adhesives, mechanical connectors, and/or forming the first body portion, second body portion, and each support as an integrated component. In the illustrated embodiment, each support of the plurality of supports 16 is welded to both the first body portion 12 and the second body portion 14.

While each support of the plurality of supports 16 has been illustrated as disposed at a particular location between the first body portion 12 and the second body portion 14, a support can be disposed at any suitable location between the first body portion and the second body portion of a fluid system. Selection of a suitable position for a support according to a particular embodiment can be based on various considerations, including the structural configuration between the first body portion and the second body portion. While each support of the plurality of supports 16 has been illustrated as having a particular structural configuration, a support can have any suitable structural configuration and selection of a suitable structural configuration for a support according to a particular embodiment can be based on various considerations, including the desired velocity at which fluid is intended to flow through a channel. For example, a support can be formed such that it is cylindrical, cuboidal, such that it defines an airfoil oriented toward the first body portion or second body portion, or such that it forms a portion of a wall that defines a channel.

While the fluid system 10 has been illustrated as including a plurality of supports 16, a fluid system can include any suitable number of supports and selection of a suitable number of supports to include in a fluid system can be based on various considerations, including the desired velocity at which fluid is intended to flow through a channel defined through the fluid system. Example number of supports considered suitable to include in a fluid system include zero, one, at least one, two, a plurality, three, four, five, and any other number considered suitable for a particular embodiment. For example, alternative to including a support, or a plurality of supports, a fluid system can include a second body portion that is directly attached to a first body portion.

In the illustrated embodiment, each spacer of the plurality of spacers 18 has a first end 120 a second end 122, and a main body 121 and is attached to both the first body portion 12 and the second body portion 14 to define a plurality of injection openings 126. In the illustrated embodiment, each spacer of the plurality of spacers 18 is partially disposed within the injection opening 102 such that the injection opening 102 is partially obstructed by each spacer of the plurality of spacers 18. This is considered advantageous at least because partially obstructing the injection opening 102 with the plurality of spacers 18 provides a mechanism for positioning a plurality of jets 192, as described in more detail herein, alone the top surface 84 of the second body portion 14 and various lift profiles.

In the illustrated embodiment, the main body 124 of each spacer f the plurality of spacers 18 defines a front surface 128, an edge 130, and has a rectangular cross-sectional configuration such that each spacer of the plurality of spacers 18 has a curved cuboidal structural arrangement that is configured to mate with a portion of the length of the channel 106. The front surface 128 of each spacer of the plurality of spacers 18 extends from the first body portion 12 to the second body portion 14 and is considered the surface that is directed toward the environment exterior to the channel 106 cooperatively defined by the first body portion 12 and the second body portion 14. The edge 130 is disposed at the junction between the first end 120 and the front surface 128 of each spacer of the plurality of spacers 18. In the illustrated embodiment, the edge 130 of each spacer of the plurality of spacers 18 is coplanar with the first intermediate edge 42.

Each spacer of the plurality of spacers 18 can be attached to the first body portion 12 and the second body portion 14 using any suitable technique or method of attachment and selection of a suitable technique or method of attachment between a spacer and a first body portion and/or second body portion according to a particular embodiment can be based on various considerations, including the material(s) that forms the spacer, the first body portion, and/or the second body portion. Example techniques and methods of attachment considered suitable include welding, fusing, using adhesives, mechanical connectors, and/or forming the first body portion, second body portion, and each spacer as an integrated component. In the illustrated embodiment, each spacer of the plurality of spacers 18 is a separate component welded to both the first body portion 12 and the second body portion 14.

While each spacer of the plurality of spacers 18 has been illustrated as having a particular structural arrangement and as being positioned at a particular location on the fluid system 10, a spacer can be positioned at any suitable location on a fluid system and have any suitable structural arrangement, Selection of a suitable location to position a spacer and a suitable structural arrangement for a spacer according to a particular embodiment can be based on various considerations, such as the desired flow through a channel defined by a fluid system and/or the desired flow around a fluid system. For example, alternative to positioning an edge located between the first end and the front surface of a spacer coplanar with the first intermediate edge of a first body portion, an edge located between the first end and the front surface of a spacer can be positioned such that it is disposed outside of the channel cooperatively defined by a first body portion and a second body portion (e.g., such that it is not coplanar with the first intermediate edge and is positioned downstream from the first intermediate edge), or such that it is disposed within the channel cooperatively defined by a first body portion and a second body portion (e.g., such that it is not coplanar with the first intermediate edge). Spacers included in a fluid system can be spaced equally from one another (e.g., evenly), or be spaced at various lengths from one another depending on the lift and thrust desired to be accomplished by the fluid system. Example structural arrangements considered suitable for a spacer include spacers that are cuboidal, curved cuboids, cylindrical, spacers that include one or more curved surfaces, spacers that have a "C" cross-sectional shape such that a first portion is disposed at, or near, the injection opening of a fluid system and a second portion partially extends through a portion of the channel, and any other structural arraignment considered suitable for a particular embodiment.

While a plurality of spacers 18 has been illustrated, a fluid system can include any suitable number of spacers and selection of a suitable number of spacers to include in a fluid system according to a particular embodiment can be based on various considerations, such as the desired fluid flow through a channel defined by a fluid system and/or the desired fluid flow around a fluid system. Examples of numbers of spacers considered suitable to include in a fluid system include one, at least one, two, a plurality, three, four, five, six, seven, eight, nine, ten, more than ten, and any other number considered suitable for a particular embodiment.

Figure 3:
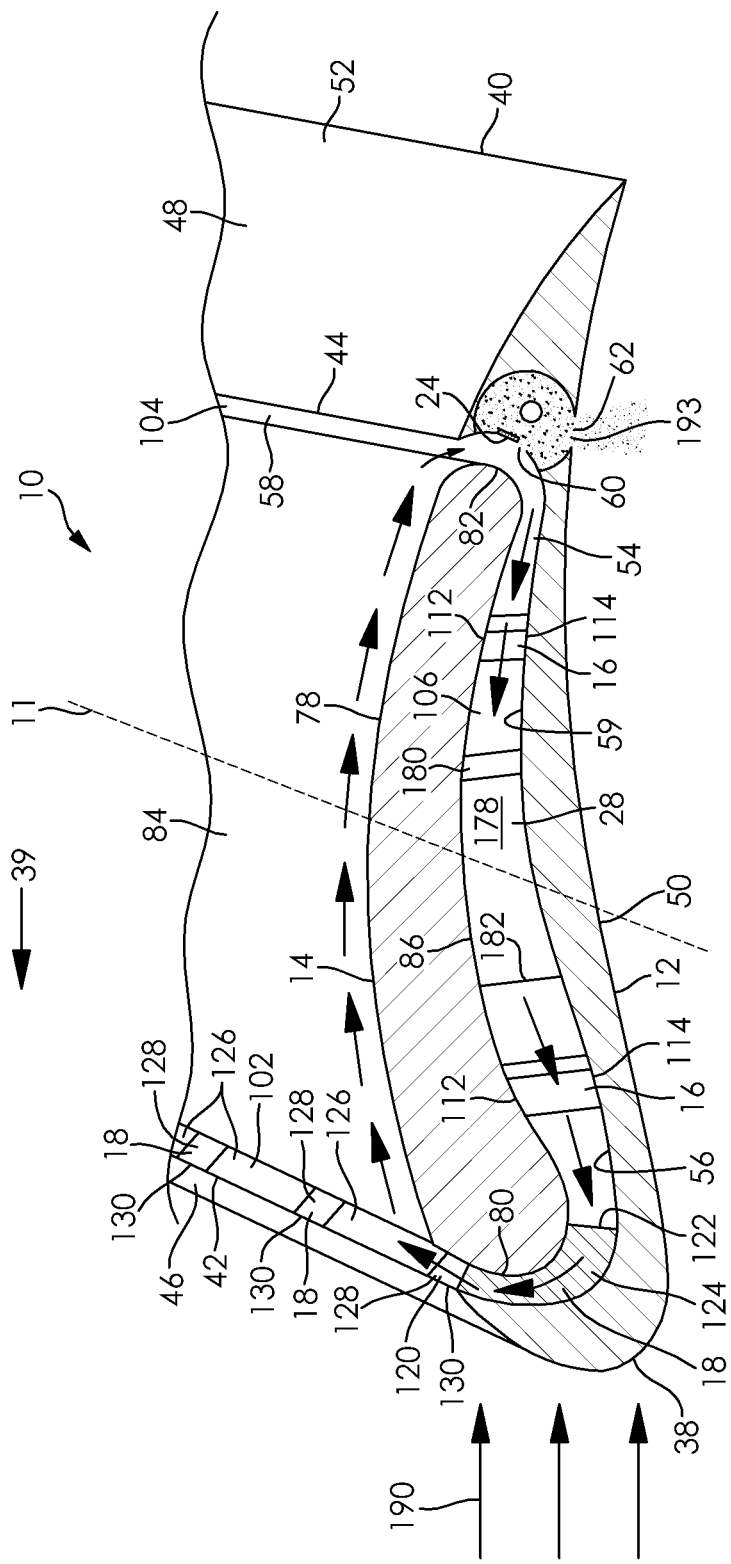
FIG. 3 is a partial perspective cross-sectional view of the fluid system illustrated in FIG. 1 taken along a plane that is orthogonal to the lengthwise axis of the fluid system.

As shown in FIG. 6, in the illustrated embodiment, the first panel 20 is moveably attached to the first body portion 12 and has a first surface 136, a second surface 138, a thickness 139 that extends from the first surface 136 to the second surface 138, a length 141, and a main body 140 that defines a toothed geometry 142. The first panel 20 has a closed configuration, as shown in FIGS. 2 and 6, and an open configuration, as shown in FIG. 3, and is moveable between these configurations via the first actuator 22, as described in more detail herein. In the closed configuration, the first panel 20 is disposed over the third opening 62 (e.g., completely covers the third opening 62), the first surface 136 is directed toward the cavity 64 defined by the first body portion 12, and the second surface 138 is directed toward an environment exterior to the cavity 64 and the channel 106. The toothed geometry 142 is sized and configured to mate with the toothed geometry 154 defined by a portion of the first actuator 22, as described in more detail herein.

An actuator included in a fluid system can comprise any suitable actuator and selection of a suitable actuator can be based on various considerations, such as the structural arrangement of a panel included in a fluid system and/or the material that forms a panel included in a fluid system. Examples of actuators considered suitable to include in a fluid system include electric motors, pneumatic actuators, hydraulic actuators, actuators that produce rotational movement around the lengthwise axis of an attached shaft, actuators that produce axial movement of a shaft along the lengthwise axis of the shaft, and any other actuator considered suitable for a particular embodiment. In the illustrated embodiment, each of the first actuator 22 and the second actuator 26 is an electric motor.

The first actuator 22 is moveable between an off state, an open state, and a close state and comprises a motor 148, a shaft 150, and a drive gear 152 that defines a toothed geometry 154. The motor 148 can be operatively connected to any suitable portion of the device, system, or component on which the fluid system is disposed to provide power to the first actuator 22 (e.g., battery, electric motor) and to provide a mechanism for moving the first actuator 22 between the off state, the open state, and the close state (e.g., one or more switches). The first actuator 22 is positioned relative to the first panel 20 such that the toothed geometry 154 of the drive gear 152 is in communication with, and mates with, the toothed geometry 142 of the first panel 20 and movement of the first panel 20 can be achieved via movement of the first actuator 22 between its states.

In the off state, the first actuator 22 maintains its position such that the first panel 22 maintains its position relative to the first body portion 12. In the open state, the first actuator 22 moves the shaft 150 around the lengthwise axis of the shaft 150 in a first direction such that the first panel 22 moves along the lengthwise axis 11 of the fluid system 10 in a first direction and fluid and/or debris disposed within the cavity 64 can pass through the third opening 62 and into an environment exterior to the cavity 64. In the close state, the first actuator 22 moves the shaft 150 around the lengthwise axis of the shaft 150 in a second direction such that the first panel 22 moves along the lengthwise axis 11 of the fluid system 10 in a second direction, opposite that of the first direction, and fluid and/or debris disposed within the cavity 64 can accumulate within the cavity 64 and does not pass through the third opening 62.

As shown in FIG. 6, in the illustrated embodiment, the second panel 24 is moveably attached to the first body portion 12 within the cavity 64 and has a first surface 160, a second surface 162, a thickness 163 that extends from the first surface 160 to the second surface 162, a length 163, and a main body 164 that defines a toothed geometry 166. The second panel 24 has a closed configuration, as shown in FIGS. 2 and 6, and an open configuration, as shown in FIG. 3, and is moveable between these configurations via the second actuator 26. In the closed configuration, the second panel 22 is disposed over the second opening 60 (e.g., completely covers the second opening 60), the first surface 160 is directed toward the channel 106 cooperatively defined by the first body portion 12 and the second body portion 14, and the second surface 162 is directed toward the cavity 64 defined by the first body portion 12. The toothed geometry 166 is sized and configured to mate with the toothed geometry 174 defined by a portion of the second actuator 26, as described in more detail herein.

The second actuator 26 is moveable between an off state, an open state, and a close state and comprises a motor 168, a shaft 170, and a drive gear 172 that defines a toothed geometry 174. The motor 168 can be operatively connected to any suitable portion of the device, system, or component on which the fluid system is attached to provide power to the second actuator 26 (e.g., battery, electric motor) and to provide a mechanism for moving the second actuator 26 between the off state, the open state, and the close state (e.g., one or more switches). The second actuator 26 is positioned relative to the second panel 24 such that the toothed geometry 174 of the drive gear 172 is in communication with, and mates with, the toothed geometry 166 of the second panel 24 and movement of the second panel 24 can be achieved via movement of the second actuator 26 between its states.

In the off state, the second actuator 26 maintains its position such that the second panel 24 maintains its position relative to the first body portion 12. In the open state, the second actuator 26 moves the shaft 150 around the lengthwise axis of the shaft 150 in a first direction such that the second panel 24 moves away from the bottom surface 50 of the first body portion 12 and toward the rear surface 48 and fluid and/or debris travelling through the channel 106 can enter the cavity 64 defined by the first body portion 12 and, if the first panel 20 is closed, accumulate in the cavity 64. Alternatively, if the first panel 20 is open, the fluid and/or debris can pass through the second opening 60 and the third opening 62 and into an environment exterior to the channel 106 and the cavity 64. In the close state, the second actuator 26 moves the shaft 150 around the lengthwise axis of the shaft 150 in a second direction, opposite that of the first direction, such that the second panel 24 moves away from the rear surface 48 and toward the bottom surface 50 of the first body portion 12 and fluid and/or debris travelling through the channel 106 does not enter the cavity 64 and travels past the second panel 24 and exits through the injection opening 102.

While each of the first panel 20, first actuator 22, second panel 24, and second actuator 26 have been illustrated as having a particular structural arrangement and as being located at a particular position on the fluid system, a first panel, a first actuator, a second panel, and a second actuator can have any suitable structural arrangement and be located at any suitable position on a fluid system. Selection of a suitable structural arrangement and/or position to locate a first panel, a first actuator, a second panel, and a second actuator can be based on various considerations, such as the desired flow around a fluid system and/or the desired flow through a channel defined through a fluid system. For example, alternative to including a mating toothed geometry between the first panel and the first actuator and/or between the second panel and the second actuator, a panel can be positioned relative to an actuator that includes a plate and a threaded shaft that moves into and out of the motor which results in the plate contacting a portion of the panel and movement of the panel between the closed and open configurations. Alternative to positioning each of a first panel, a first actuator, a second panel, and a second actuator in a cavity defined by a first body portion, each of these components can be positioned at other suitable locations on a fluid system. For example, a first panel and a first actuator can be positioned in a channel such that the first panel can open and close a second opening. However, it is considered advantageous to position a first panel and a first actuator in the cavity of a first body portion to avoid manipulating the flow through a channel during use. For example, a second panel and a second actuator can be positioned on the bottom surface of a first body portion such that the second panel can open and close a third opening. However, it is considered advantageous to position a second panel and a second actuator in the cavity of a first body portion to avoid manipulating the flow over a first body portion.

A fluid pressurizer included in a fluid system can comprise any suitable device, system, or component capable of pressurizing fluid and selection of a suitable fluid pressurizer can be based on various considerations, such as the structural arrangement of a channel cooperatively defined by a first body portion and second body portion. Examples of fluid pressurizers considered suitable to include in a fluid system include electric pumps, pneumatic pumps, hydraulic pumps, fans, micro-compressors, vacuums, and any other fluid pressurizer considered suitable for a particular embodiment. In the illustrated embodiment, the fluid pressurizer 28 is an electric pump. In alternative embodiments, a pump can be omitted from a fluid system or can comprise a fan, or can be air injected into a channel from an engine attached to the fluid system (e.g., jet engine).

In the illustrated embodiment, the fluid pressurizer 28 is disposed within the channel 106 and is in communication with the injection opening 102 and the suction opening 104. The fluid pressurizer 28 is moveable between an off state and an on state and comprises a pump 178, a suction port 180, and a discharge port 182. It is considered advantageous to include a fluid pressurizer 28 at least because it provides a mechanism for pressurizing fluid 191 passing through channel 106 and forming one or more jets 192 as the fluid 191 exits the injection opening 102. A fluid pressurizer 28, such as pump 178, can be operatively connected to any suitable portion of the device, system, or component on which the fluid system is disposed to provide power to the fluid pressurizer 28 (e.g., battery, electric motor) and to provide a mechanism for moving the fluid pressurizer 28 between the off state and the on state (e.g., one or more switches). Alternative embodiments can include a fluid pressurizer that can vary the degree to which fluid is pressurized through the channel 106.

In the illustrated embodiment, the fluid pressurizer 28 is attached to both the first body portion 12 and the second body portion 14 and is positioned such that the suction port 180 is directed toward a first portion of the channel 106 that extends from the suction opening 104 to the pump 178 (e.g., the suction port 180 is directed toward the suction opening 104) and the discharge port 182 is directed toward a second portion of the channel 106 that extends from the injection opening 102 to the pump 178 (e.g., the discharge port 182 is directed toward the injection opening 102). In the off state, the pump 178 does not draw any fluid through the channel 106. In the on state, the pump 178 draws fluid through the suction opening 104, through the channel 106 and pump 178, and pushes fluid out of the injection opening 102.

A fluid pressurizer can be attached to a first body portion and/or second body portion using any suitable technique or method of attachment and selection of a suitable technique or method of attachment between a fluid pressurizer and a first body portion and/or second body portion according to a particular embodiment can be based on various considerations, including the material(s) that forms the fluid pressurizer, the first body portion, and/or the second body portion. Example techniques and methods of attachment considered suitable include welding, fusing, using adhesives, mechanical connectors, and any other technique or method considered suitable for a particular embodiment. In the illustrated embodiment, the fluid pressurizer is fastened to the first body portion 12 and the second body portion 14 using mechanical connectors (e.g., screws, bolts). Alternative embodiments, however, can include a fluid pressurizer that is only attached to a first body portion or a second body portion.

As shown in FIG. 7, a conventional airfoil is generally a solid structure that allows fluid to flow around the airfoil producing a relatively large degree of separation through a fluid flow field relative to the fluid system 10, as shown in FIG. 1, which has a first body portion 12 stacked with a second body portion 14 along the wing span. As shown in FIGS. 1, 2, and 3 the fluid flow 190 interacts with the fluid system 10 such that the fluid 191, which in this example is air, travels around, and through, the fluid system 10. The fluid 191 travels into the suction opening 104, through the channel 106, is pressurized by the fluid pressurizer 28, exits at the injection opening 102 through each injection opening of the plurality of injection openings 126, and is injected into the fluid flow 191 as a plurality of jets 192 over the top surface 84 of the second body portion 14. Depending on the number of spacers, pumps, and/or channels included in a fluid system, alternative embodiments can form a single jet over the top surface of the second body portion. In the illustrated embodiment, the jet 192 of fluid is substantially tangential to the top surface 84 of the second body portion 14 downstream of the injection opening 102. The one or more jets 192 are co-flow jets in that they form a stream of fluid that is injected into a separate fluid, or fluid flow. In the illustrated embodiment, the one or more jets 192 are substantially tangential to the top surface 84 of the second body portion 14 downstream of the injection opening 102. However, alternative embodiments can include one or more jets that are not tangential to the top surface of a second body portion (e.g., jets can be varied based on position of a moveable first intermediate edge, can be 45 degrees relative to the top surface of a second body portion, can be between about 9 degrees (tangential) and about 45 degrees relative to the top surface of a second body portion). As described herein, the angle at which the first body portion 12 is disposed relative to the inner surface 56 can vary at the injection opening 102, which provides a mechanism for modifying the angle at which a jet is formed (e.g., during use, can be varied multiple times during flight) relative to the top surface of a second body portion.

In the illustrated embodiment, when the fluid system 10 is moving in a forward direction, shown by arrow 39, and the fluid pressurizer 28 is in an on state, the fluid 191 travels through the suction opening 104 and into the channel 106, travels toward the trailing edge 40, and encounters the second opening 60 and the cavity 64 when the second panel 24 is in the open configuration and before the fluid changes direction toward the injection opening 102. As shown in FIG. 2, debris 193 that has passed through the second opening 60 accumulates in the cavity 64 when the first panel 20 is in the closed configuration. To remove debris 193 from the cavity 64, the first panel 20 is moved to the open configuration, as shown in FIG. 3, such that the debris 193 and any other debris entering the cavity 64 while the first panel 20 and the second panel 22 are open can pass through the third opening 62 and into an environment external to the cavity 64 and the fluid system 10. Alternatively, debris can be removed from a cavity by moving a second panel to the closed configuration and a first panel to the open configuration such that the debris can pass through a third opening and into an environment external to the cavity and a fluid system. Removal of debris can be accomplished at any suitable time, for any suitable duration of time, and at any suitable location. For example, if a fluid system is in flight, removal of accumulated debris can occur during flight or when the fluid system is grounded.

As described above, as shown in FIG. 6, the second opening 60 and the cavity 64 are positioned on the first body portion 12 such that fluid passing through the suction opening 104 and into the channel 106 toward the trailing edge 40 encounters the second opening 60 and the cavity 64 when the second panel 24 is in the open configuration and before the fluid changes direction of travel toward the injection opening 102. In the illustrated embodiment, each of the second opening 60, the third opening 62, and cavity 64 is disposed between the trailing edge 40 and a plane that is orthogonal to the chord length 13 that contains the rear edge 82 of the second body portion 14. In the illustrated embodiment, the debris 193 disposed in the fluid 191 (e.g., air) has a higher density than the fluid 191 and experiences higher centrifugal forces that result in the debris 193 being forced through the second opening 60 and into the cavity 64 when the fluid system 10 is moving in a forward direction, as shown by arrow 39, and/or the fluid pressurizer 28 is in an on state. The position of the second opening 60 and the cavity 64 is considered advantageous at least because it provides a mechanism for filtering out debris 193 that enters the channel 106 defined by the fluid system 10 prior to the debris 193 entering the fluid pressurizer 28, such as pump 178. Alternatively, when there is a relatively low amount, or no, debris in the fluid through which the fluid system is traveling, a second panel can be positioned in the closed configuration such that the fluid can travel through a suction opening and a channel and directly to a fluid pressurizer.

While each of the second opening 60, the third opening 62, and cavity 64 has been illustrated as disposed between the trailing edge 40 and a plane that is orthogonal to the chord length 13 that contains the rear edge 82 of the second body portion 14, a second opening, third opening, and cavity of a fluid system can be positioned at any suitable location on a fluid system. Selection of a suitable location to position a second opening, third opening, and/or cavity can be based on various considerations, such as the desired fluid flow through a channel defined by the fluid system. For example, a third opening and/or a cavity defined by a first body portion can be positioned at any suitable location on a first body portion such that each of the cavity and/or the third opening are in communication with the second opening. A third opening and/or a cavity defined by a first body portion can be positioned between a recess base and a bottom surface of a first body portion or between a front surface and a bottom surface of a first body portion.

Optionally, a fluid system can include one or more sensors within a cavity defined by a first body portion that are configured to alert a user of the fluid system (e.g., pilot of an airplane) that the debris accumulated within the cavity has reached a certain level and removal of the debris should be completed. Any suitable sensor having any suitable structural configuration can be included in a fluid system and selection of a suitable sensor can be based on various considerations, such as the intended use of the sensor. Example sensors considered suitable to include in a fluid system include fluid level sensors, ultrasonic sensors, infrared sensors, imaging devices, and any other sensor considered suitable for a particular embodiment. A sensor included in a fluid system can be operatively connected to a portion of the device, system, or component on which a fluid system is disposed to provide power to the sensor (e.g., battery, electric motor), communication between the sensor and a user of the fluid system, and to provide a mechanism for moving the sensor between an off state and an on state (e.g., one or more switches).

The first body portion 12, the second body portion 14, the plurality of supports 16, the plurality of spacers 18, the first panel 20, the second panel 22, the first actuator 24, the second actuator 26, the fluid pressurizer 28, and any other feature, element, or component described herein and included in the fluid system 10 can be formed of any suitable material and manufactured using any suitable technique. Selection of a suitable material to form a first body portion, a second body portion, a plurality of supports, a plurality of spacers, a first panel, a second panel, a first actuator, a second actuator, a fluid pressurizer, and any other feature, element, or component described herein and included in a fluid system and a suitable technique to manufacture a first body portion, a second body portion, a plurality of supports, a plurality of spacers, a first panel, a second panel, a first actuator, a second actuator, a fluid pressurizer, and any other feature, element, or component described herein and included in a fluid system can be based on various considerations, including the intended use of the fluid system. Example materials considered suitable to form a first body portion, a second body portion, a plurality of supports, a plurality of spacers, a first panel, a second panel, a first actuator, a second actuator, a fluid pressurizer, and/or any other feature, element, or component described herein include conventional materials, metals, steel, alloys, plastics, combinations of metals and plastics, composite materials, and any other material considered suitable for a particular embodiment. Example methods of manufacture considered suitable to manufacture a first body portion, a second body portion, a plurality of supports, a plurality of spacers, a first panel, a second panel, a first actuator, a second actuator, a fluid pressurizer, and/or any other feature, element, or component described herein include convention methods and techniques, injection molding, machining, 3D printing, and/or any other method or technique considered suitable for a particular embodiment. For example, a first body portion and second body portion of a fluid system can be formed of a first material and each spacer included in the fluid system can be formed of a second material that is different than the first material. For example, a panel included in a fluid system can be formed of a malleable material such that when it is moved between its open and closed configurations it forms to the structure to which it is attached.

While the first body portion 12, the second body portion 14, the plurality of supports 16, the plurality of spacers 18, the first panel 20, the second panel 22, the first actuator 24, the second actuator 26, the fluid pressurizer 28, and any other feature, element, or component described herein and included in the fluid system 10 has been illustrated as having a particular structural configuration, a first body portion, a second body portion, a plurality of supports, a plurality of spacers, a first panel, a second panel, a first actuator, a second actuator, a fluid pressurizer, and any other feature, element, or component described herein and included in a fluid system can have any suitable structural arrangement. Selection of a suitable structural arrangement for a first body portion, a second body portion, a plurality of supports, a plurality of spacers, a first panel, a second panel, a first actuator, a second actuator, a fluid pressurizer, and any other feature, element, or component described herein and included in a fluid system can be based on various considerations, including the intended use of the fluid system.

The embodiments described herein are considered advantageous for any type of flight, including transonic flights (e.g., between about Mach 0.6 and about Mach 0.95). When included on aircraft that will be completing transonic flights, or on aircrafts in which a shock wave may be created on the upper surface of the airfoil, the suction opening can be disposed downstream from where a shock wave may be created, or between the trailing edge and where the shock wave may be created.

FIGS. 8 and 9 illustrate another example fluid system 210. The fluid system 210 is similar to the fluid system 10 illustrated in FIGS. 1, 2, 3, 4, 5, and 6 and described above, except as detailed below. The fluid system 210 has a lengthwise axis 211, a chord length 213, a first body portion 212, a second body portion 214, a plurality of supports 216, a plurality of spacers 218, and a fluid pressurizer 228. In the illustrated embodiment, the fluid system 210 is included on the airfoil 230 of a wing 232 of an aircraft.

In the illustrated embodiment, the fluid system 210 omits the inclusion of a second opening, a third opening, a cavity, a first panel, a first actuator, a second panel, and a second actuator, such as those described with respect to fluid system 10. However, any of the fluid systems described herein, such as fluid system 210, can include a plurality of supports, a second opening, a third opening, a cavity, a first panel, a first actuator, a second panel, and/or a second actuator, such as those described with respect to fluid system 10.

In the illustrated embodiment, the second body portion 214 defines a plurality of recesses 402, the fluid system 210 includes a plurality of spacer actuators 404, and each spacer of the plurality of spacers 218 is moveable between a first position, as shown in FIG. 8, and a second position, as shown in FIG. 9. In the first position, a first volume of each spacer of the plurality of spacers 218 is disposed within the channel 306 and partially obstructs fluid flow through the channel 306. In the second position, each spacer of the plurality of spacers 218 is entirely disposed within a recess of the plurality of recesses 402 such that a second volume of each spacer of the plurality of spacers 218 is disposed within the channel 306. In the illustrated embodiment, the first volume is greater than the second volume.

Each recess of the plurality of recesses 402 extends from the top surface 284 and into the main body 278 of the second body portion 214 and is sized and configured to receive a spacer of the plurality of spacers 218 and a spacer actuator of the plurality of spacer actuators 404.

A spacer actuator included in a fluid system can comprise any suitable actuator and selection of a suitable actuator can be based on various considerations, such as the structural arrangement of a recess defined by a second body portion and/or the structural arrangement of a spacer included in a fluid system. Examples of spacer actuators considered suitable to include in a fluid system include electric motors, pneumatic actuators, hydraulic actuators, actuators that produce rotation movement around the lengthwise axis of an attached shaft, actuators that produce axial movement of a shaft along the lengthwise axis of the shaft, and any other actuator considered suitable for a particular embodiment. In the illustrated embodiment, each actuator of the plurality of spacer actuators 404 is an electric motor.

Each spacer actuator of the plurality of spacer actuators 404 is moveable between an off state, an open state, and a close state and comprises a motor 406 and a threaded shaft 408. A spacer of the plurality of spacers 218 is attached to the threaded shaft 408 of each spacer actuator of the plurality of spacer actuators 404. The motor 406 can be operatively connected to any suitable portion of the device, system, or component on which the fluid system is disposed to provide power to the actuator (e.g., battery, electric motor) and to provide a mechanism for moving the actuator between the off state, the open state, and the close state (e.g., one or more switches). Each spacer actuator of the plurality of spacer actuators 404 is positioned relative to a spacer of the plurality of spacers 218 such that movement of the spacer can be achieved via movement of the actuator between its states.

In the off state, each spacer actuator of the plurality of spacer actuators 404 maintains the position of the spacer attached to the spacer actuator relative to the second body portion 214. In the open state, the threaded shaft 408 rotates in a first direction about its lengthwise axis such that the attached spacer of the plurality of spacers 218 advances into a recess of the plurality of recesses 402 to its second position, as shown in FIG. 9, and the fluid passing through the channel 306 can pass over the spacer and out of the injection opening 302. In the second position, each spacer of the plurality of spacers 218 is disposed within a recess of the plurality of recesses 402 such that it does not obstruct any fluid flowing through channel 306 and a portion (e.g., surface) of each spacer of the plurality of spacers 218 is disposed on a hypothetical surface that extends over the recess within which it is disposed and that is continuous with the main body of the second body portion 214. In the close state, the threaded shaft 408 rotates in a second direction, opposite that of the first direction, about its lengthwise axis such that the attached spacer of the plurality of spacers 218 advances out of a recess of the plurality of recesses 402 to its first position, as shown in FIG. 8, and the fluid passing through the channel 306 is obstructed by the spacer. In the first position, each spacer of the plurality of spacers 218 is partially disposed outside of a recess of the plurality of recesses 402 such that it obstructs the fluid flowing through channel 306.

While each spacer of the plurality of spacers 218 has been described as moveable between a first position and a second position, any suitable number of spacers of a plurality of spacers can be moveable between a first position and a second position. Selection of a suitable number of spacers of a plurality of spacers to include in a fluid system that are moveable can be based on various considerations, such as the desired flow through a channel defined by a fluid system. For example, one or more spacers can be fixed in place, such as those described with respect to FIGS. 1, 2, 3, 4, 5, and 6, and one or more spacers can be moveable between a first position and a second position, such as those described with respect to FIGS. 8 and 9 and with respect to FIGS. 10 and 11, as described in more detail herein. It is considered advantageous to include a spacer that is, or a plurality of spacers that are, moveable between a first position in which the spacer, or each spacer of the plurality of spacers, obstructs a portion of the injection opening and a second position in which the spacer, or each spacer of the plurality of spacers, does not obstruct a portion of the injection opening at least because it provides a user of the fluid system with a mechanism to manipulate the power consumption of the fluid system, the fluid forces being applied to the fluid system, the flow characteristics of a jet across the second body portion, and/or the flow characteristics of fluid across the first body portion, second body portion, and/or channel during use of the fluid system (e.g., during flight). For example, when a fluid system, such as fluid system 210 illustrated herein with respect to FIGS. 8 and 9 or fluid system 610 illustrated in FIGS. 10 and 11, and described in more detail herein, are included on the wing of an aircraft, a large thrust may be desired at take off and a small amount of lift may be desired at cruise altitude. In this example, it is considered advantageous to position a spacer, or a plurality of spacers, in the first position during take off and the spacer, or the plurality of spacers, in the second position during flight at cruise altitude to increase the thrust at take off, reduce the lift required at cruise altitude, and reduce the energy required to achieve lift and thrust.

While a plurality of spacer actuators 404 has been illustrated, a fluid system can include any suitable number of actuators and selection of a suitable number of actuators to include in a fluid system can be based on a various considerations, such as the structural arrangement of a spacer, or a plurality of spacers, included in the fluid system. For example, a single actuator can be operatively attached to each spacer of a plurality of spacers (e.g., using an elongate member) such that movement of the actuator between the off state, open state, and closed state moves each spacer of the plurality of spacers attached to the actuator between its first and second positions.

While each spacer of the plurality of spacers 218 has been illustrated as being disposed within a recess of the plurality of recesses 402 when in its second position such that it does not obstruct any fluid flowing through channel 306, a spacer can have any suitable structural configuration relative to a channel when in its first position and/or second position. Selection of a suitable structural configuration for a spacer in the first position and second position can be based on various considerations, such as the desired flow through a channel defined by a fluid system. For example, alternative to being entirety disposed within a recess defined by a second body portion in the second position, a spacer can be partially disposed within the channel when the spacer is in the second position such that it is partially disposed in the channel and partially obstructs fluid flow through the channel. While the second body portion 214 has been illustrated as defining a plurality of recesses 402 and each recess of the plurality of recesses 402 is illustrated as having an actuator of the plurality of spacer actuators 404 disposed in the recess, alternative embodiments can include a first body portion that defines structure similar to that illustrated with respect to the second body portion 214 such that a first body portion defines a plurality of recesses that are each sized and configured to receive an actuator and a spacer such that the spacer can be moved between a first position and a second position, as described herein.

FIGS. 10 and 11 illustrate another example fluid system 510. The fluid system 510 is similar to the fluid system 210 illustrated in FIGS. 8 and 9 and described above, except as detailed below. The fluid system 510 has a lengthwise axis 511, a chord length 513, a first body portion 512, a second body portion 514, a plurality of supports 516, a spacer 518, and a plurality of fluid pressurizers 528. In the illustrated embodiment, the fluid system 510 is included on the airfoil 530 of a wing 532 of an aircraft.

In the illustrated embodiment, the first body portion 512 and second body portion 514 cooperatively define an injection opening 602, a suction opening 604, a plurality of discrete channels 606, and a recess 702 and the fluid system 510 includes a spacer actuator 704 and a plurality of batteries 710. In the illustrated embodiment, the spacer 518 is moveable between a first position, as shown in FIG. 10, and a second position, as shown in FIG. 11. In the first position, a first volume of the spacer 518 is disposed within each channel of the plurality of channels 606 and partially obstructs fluid flow through each channel of the plurality of channels 606. In the second position, a second volume of the spacer 518 is disposed within each channel of the plurality of channels 606. In the illustrated embodiment, the first volume is greater than the second volume.

In the illustrated embodiment, the recess 702 extends from the top surface 584 and into the main body 578 of the second body portion 514 and is sized and configured to receive the spacer 518 and the spacer actuator 704. The spacer actuator 704 is moveable between an off state, an open state, and a close state and comprises a motor 706 and a shaft 708. The spacer 518 is attached to the shaft 708 of the spacer actuator 704 and has a length that is equal to the length of the injection opening 602. The motor 706 can be operatively connected to any suitable portion of the device, system, or component on which the fluid system is disposed to provide power to the actuator (e.g., battery, electric motor) and to provide a mechanism for moving the actuator between the off state, the open state, and the close state (e.g., one or more switches). The spacer actuator 704 is positioned relative to the spacer 518 such that movement of the spacer can be achieved via movement of the actuator between its states.

In the off state, the spacer actuator 704 maintains the position of the spacer 518 relative to the second body portion 514. In the open state, the shaft 708 moves in a first direction along its lengthwise axis such that the spacer 518 advances into the recess 702 to its second position, as shown in FIG. 11, and the fluid passing through each channel of the plurality of channels 606 can pass over the spacer 518 and out of the injection opening 602. In the second position, the spacer 518 is disposed within the recess 702 such that it does not obstruct any fluid flowing through each channel of the plurality of channels 606. In the close state, the shaft 708 moves in a second direction, opposite that of the first direction, along its lengthwise axis such that the attached spacer 518 advances out of the recess 702 to its first position, as shown in FIG. 10, and the fluid passing through each channel of the plurality of channels 606 is obstructed by the spacer 518. In the first position, the spacer 518 is partially disposed outside of the recess 702 such that it entirely obstructs the fluid flowing through each channel of the plurality of channels 606.

In the illustrated embodiment, each channel of the plurality of channels 606 extends from the injection opening 602 to the suction opening 604 such that the injection opening 602 is in communication with the suction opening 604. In the illustrated embodiment, the material that forms each channel of the plurality of channels 606 is a thermal conductive material (e.g., aluminum). During movement of the fluid system 510 in a forward direction, as shown by arrow 539, fluid flows through each channel of the plurality of channels 606 from the suction opening 604 to the injection opening 602.

In the illustrated embodiment, each fluid pressurizer of the plurality of fluid pressurizers 528 is disposed within a channel of the plurality of channels 606 and is in communication with the injection opening 602 and the suction opening 604. Each fluid pressurizer of the plurality of fluid pressurizers 528 is moveable between an off state and an on state and comprises a pump 678, a suction port 680, and a discharge port 682. A fluid pressurizer 528, such as pump 678, can be operatively connected to any suitable portion of the device, system, or component on which the fluid system is disposed to provide a mechanism for moving the fluid pressurizer 528 between the off state and the on state (e.g., one or more switches). It is considered advantageous to include a plurality of fluid pressurizers 528 at least because the jet flow through a channel of a fluid system becomes more efficient and can be controlled more effectively. For example, in embodiments in which a fluid system, such as system 510, is included on the wing of an aircraft, use of only a single fluid pressurizer decreases a user's ability to create a uniform jet along the wing span and use of a plurality of fluid pressurizers allows a user to control the jet being produced over separate sections along the wing span to create a uniform, or substantially uniform, flow. In embodiments in which a plurality of fluid pressurizers is included in a fluid system, a user can vary the degree to which fluid is pressurized through a channel by manipulating the state of each fluid pressurizer, or one or more fluid pressurizers, and a jet created by the fluid system can be manipulated and controlled by the user to adjust the lift, thrust, and/or drag to control the yaw, roll, and pitch.

In the illustrated embodiment, each fluid pressurizer of the plurality of fluid pressurizers 528 is attached to the first body portion 512 and is positioned such that the suction port 680 of each fluid pressurizer of the plurality of fluid pressurizers 528 is directed toward a first portion of a channel of the plurality of channels 606 that extends from the suction opening 604 to the pump 678 (e.g., the suction port 680 is directed toward the suction opening 604) and the discharge port 682 is directed toward a second portion of the channel of the plurality of channels 606 that extends from the injection opening 602 to the pump 678 (e.g., the discharge port 682 is directed toward the injection opening 602). In the off state, the pump 678 does not draw any fluid through its respective channel of the plurality of channels 606. In the on state, the pump 678 draws fluid through the suction opening 604, through its respective channel 606 and pump 678, and through pushes the fluid out of the injection opening 602.

In the illustrated embodiment, a battery of the plurality of batteries 710 is disposed between adjacent channels of the plurality of channels 606 and is attached to the wall that defines a channel of the plurality of channels 606 (e.g., to an inside surface, within a recess defined by the wall, on a surface exterior to a channel). Each battery of the plurality of batteries 710 is operatively connected to a fluid pressurizer of the plurality of fluid pressurizers 528 to provide power to the fluid pressurizer of the plurality of fluid pressurizers 528. It is considered advantageous to position a battery between adjacent channels of the plurality of channels 606 such that the battery's efficiency can be increased and the battery can be cooled by the fluid passing through the channel 606 (e.g., through the wall that defines the channel 606). In addition, it is considered advantageous to position a battery between adjacent channels of the plurality of channels 606 such that the heat produced by the battery can be absorbed by the wall that defines a channel to increase the total enthalpy (e.g., energy) of the fluid flow through the channel, which will enhance the efficiency of the fluid pressurizer (e.g., pumping efficiency). In addition, it is considered advantageous to position a battery between adjacent channels of the plurality of channels 606 such that the heat produced by the battery can be absorbed by the wall that defines a channel and conducted to an exterior surface of the fluid system 510 and absorbed by an environment exterior to the fluid system 510 during use (e.g., during flight).

Each battery of the plurality of batteries 710 can be attached to the wall that defines a channel of the plurality of channels 606 using any suitable technique or method of attachment. Selection of a suitable technique or method of attachment between a battery and a wall that defines a channel according to a particular embodiment can be based on various considerations, including the material(s) that forms the battery and/or the material(s) that form the wall of the channel. Example techniques and methods of attachment considered suitable include welding, fusing, using adhesives, mechanical connectors, using high heat conductive materials, and any other method or technique considered suitable for a particular embodiment.

While a battery of the plurality of batteries 710 has been illustrated as disposed between adjacent channels of the plurality of channels 606, a battery, or a plurality of batteries, can be positioned at any suitable location on a fluid system. Selection of a suitable location to position a battery, or a plurality of batteries, can be based on various considerations, such as the desired cooling intended to be imparted on the battery, or plurality of batteries. For example, a fluid system can omit the inclusion of a battery between adjacent channels, include a plurality of batteries between adjacent channels, include a single battery, or multiple batteries, disposed adjacent a channel (e.g., attached to a wall that forms a channel), and/or include a single battery between adjacent channels. Any suitable battery can be included in a fluid system, such as lithium ion batteries.

While each battery of the plurality of batteries 710 has been illustrated as operatively connected to a fluid pressurizer of the plurality of fluid pressurizers 528 to provide power to the fluid pressurizer of the plurality of fluid pressurizers 528, a battery, or a plurality of batteries, can be operatively connected to any suitable feature, device, and/or system. Selection of a suitable feature, device, and/or system to operatively attach a battery, or a plurality of batteries, can be based on various considerations, such as the intended use of a fluid system of which the battery, or plurality of batteries, are included. For example, a battery, or a plurality of batteries, included in a fluid system can be attached to one or more fluid pressurizers, one or more actuators, such as those described herein, and/or any other feature, device, and/or system considered suitable for a particular embodiment.

While a single spacer actuator 704 has been illustrated as moving the spacer 518 between the first and second positions, a fluid system can include any suitable number of actuators and selection of a suitable number of actuators to include in a fluid system can be based on a various considerations, such as the structural arrangement of a spacer included in the fluid system. For example, a plurality of spacer actuators can be operatively attached to a single spacer such that movement of the plurality of actuators between the off state, open state, and closed state moves the spacer that is attached to each actuator of the plurality of actuators between its first and second positions. Alternative embodiments can include a combination of the configurations illustrated in FIGS. 8 and 9 and those illustrated in FIGS. 10 and 11 such that discrete spacers are disposed along a first portion of the injection opening and a single elongated spacer is disposed along a second portion of the injection opening.

While the spacer 518 has been illustrated as being disposed within a recess of the plurality of recesses 702 when in its second position such that it does not obstruct any fluid flowing through each channel of the plurality of channels 606, a spacer can have any suitable structural configuration relative to a channel when in its second position. Selection of a suitable structural configuration for a spacer in the first position and second position can be based on various considerations, such as the desired flow through a channel defined by a fluid system. For example, alternative to being entirety disposed within a recess defined by a second body portion, a spacer can be partially disposed within the channel when the spacer is in the second position such that it is partially disposed in the channel and partially obstructs fluid flow through the channel. In alternative embodiments, a spacer can be moved to a position between its first and second positions such that the cross-sectional area of the injection slot can be varied during use. While the second body portion 514 has been illustrated as defining a recess 702 that has a spacer actuator 704 disposed in the recess 702, alternative embodiments can include a first body portion that has structure similar to that illustrated with respect to the second body portion 514 that defines a recess that is sized and configured to receive an actuator and a spacer such that the spacer can be moved between a first position and a second position, as described herein.

While the fluid system 510 has been illustrated as including an injection opening 602, a suction opening 604, and a plurality of channels 606, a fluid system can include any suitable number of injection openings, suction openings, and/or channels. Selection of a suitable number of injection openings, suctions openings, and channels to include in a fluid system can be based on various considerations, including the desired flow through the fluid system. For example, a fluid system can include a single injection opening that is in communication with a plurality of channels, a single suction opening that is in communication with a plurality of channels, a plurality of injection openings in communication with a single channel, a plurality of suction openings in communication with a single channel, a plurality of injection openings each in communication with a separate channel of a plurality of channels, a plurality of suction openings each in communication with a separate channel of a plurality of channels, and/or any other arrangement considered suitable for a particular embodiment. Alternatively, separate structure can be disposed within a channel defined by a fluid system to define a plurality of injection openings, a plurality of suction openings, and/or a plurality of channels. For example, a plurality of ducts can be disposed in a channel cooperatively defined by the first and second body portions to define a plurality of injection openings, a plurality of suction openings, and/or a plurality of channels and one or more fluid pressurizers can be disposed within a duct of the plurality of ducts.

FIG. 12 illustrates another example fluid system 810. The fluid system 810 is similar to the fluid system 510 illustrated in FIGS. 10 and 11 and described above, except as detailed below. The fluid system 810 has a lengthwise axis 811, a chord length 813, a first body portion 812, a second body portion 814, a plurality of supports 816, a spacer 818, and a fluid pressurizer 828. In the illustrated embodiment, the fluid system 810 is included on the airfoil 830 of a wing 832 of an aircraft.

In the illustrated embodiment, the first intermediate edge 842 of the first body portion 812 defines a sinusoidal edge 1020 and a portion of the front surface 846 has a waved configuration that corresponds to the to the sinusoidal edge 1020. Sinusoidal edge 1020 is defined along between the front surface 846 and a surface that is directed away from the leading edge 838 and comprises a plurality of peaks 1022 and troughs 1024 that can have any suitable amplitude and frequency, such as those described herein. The peaks 1022 and troughs 1024 are disposed about the same distance from the leading edge 838 of the first body portion 812 (e.g., some variation may exist depending on the angle the first intermediate edge 842 is disposed relative to the leading edge 838). This structural arrangement provides a mechanism for enhancing the mixture of fluid that passes over the front surface 846 of the first body portion 812 and that travels over the second body portion 814.

The sinusoidal edge 1020 can comprise any suitable amplitude (e.g., peak to peak amplitude) and frequency and selection of a suitable amplitude and frequency according to a particular embodiment can be based on various considerations, including the desired flow characteristics intended to be achieved. Example amplitudes (e.g., peak to peak) considered suitable for a first intermediate edge of a first body portion include amplitudes equal to 1% to 100% of the distance between a first body portion and a second body portion at an injection opening and relative to the midline of fluid flow through the injection opening, amplitudes substantially equal to 1% to 100% of the distance between a first body portion and a second body portion at an injection opening and relative to the midline of fluid flow through the injection opening, and amplitudes about 1% to about 100% of the distance between a first body portion and a second body portion at an injection opening and relative to the midline of fluid flow through the injection opening, and any other amplitude considered suitable for a particular embodiment.

While the first intermediate edge 842 of the first body portion 812 has been illustrated as defining a sinusoidal edge 1020, the first intermediate edge of a first body portion can define any suitable structural configuration. Selection of a suitable structural configuration for the first intermediate edge of a first body portion to define according to a particular embodiment can be based on various considerations, including the flow characteristics intended to be achieved. Example structural configurations considered suitable include curved, wavy, angled, sinusoidal, and any other structural configuration considered suitable for a particular embodiment.

While the first intermediate edge 842 of the first body portion 812 and a portion of the front surface 846 of the first body portion 812 have been illustrated as having a particular structural arrangement, a first body portion of a fluid system can have any suitable structural arrangement. Selection of a suitable structural arrangement for a first body portion according to a particular embodiment can be based on various considerations, including the flow characteristics intended to be achieved. For example, while FIG. 12 illustrates a portion of the front surface 846 of the first body portion 812 as having a waved configuration that corresponds to the to the sinusoidal edge 1020, the front surface of first body portion can define a sinusoidal configuration, or waved configuration, that corresponds to a sinusoidal edge defined by the front surface of a first body portion. Alternative embodiments can include a first intermediate edge that defines a sinusoidal edge along a portion of the length of a front surface of a first body portion such that the sinusoidal edge extends into a portion of the front surface and the inner surface of the first body portion. In this alternative embodiment, the peaks are disposed at the first intermediate edge of the first body portion and the troughs are disposed between the first intermediate edge and the leading edge of the first body portion. Alternative embodiments can include a first body portion that defines a sinusoidal edge on the first intermediate edge and a surface can extend from the first intermediate edge to the inner surface such that the edge between the surface and the inner surface does not define a sinusoidal edge (e.g., it is continuous) and is disposed parallel to a hypothetical line that is disposed between the peaks and troughs defined by the sinusoidal edge. In this alternative embodiment, the peaks and troughs are disposed about the same distance from the leading edge of the first body portion (e.g., some variation may exist depending on the angle the first intermediate edge is disposed relative to the leading edge). Alternative embodiments can include a first body portion that defines a projection that extends from the main body of the first body portion and that defines a sinusoidal edge that extends away from the bottom surface of the first body portion. In this alternative embodiment, the peaks and troughs are disposed about the same distance from the leading edge of the first body portion (e.g., some variation may exist depending on the angle the first intermediate edge is disposed relative to the leading edge). Alternative embodiments can omit a first body portion that defines a sinusoidal edge and include a spacer, such as spacer 218, that defines a sinusoidal edge, such as sinusoidal edge 1020. In these alternative embodiments, the spacer defines the sinusoidal edge on the surface of the spacer that is directed toward the first body portion that comprises a plurality of peaks and troughs that can have any suitable amplitude and frequency, such as those described herein.

Figure 13:
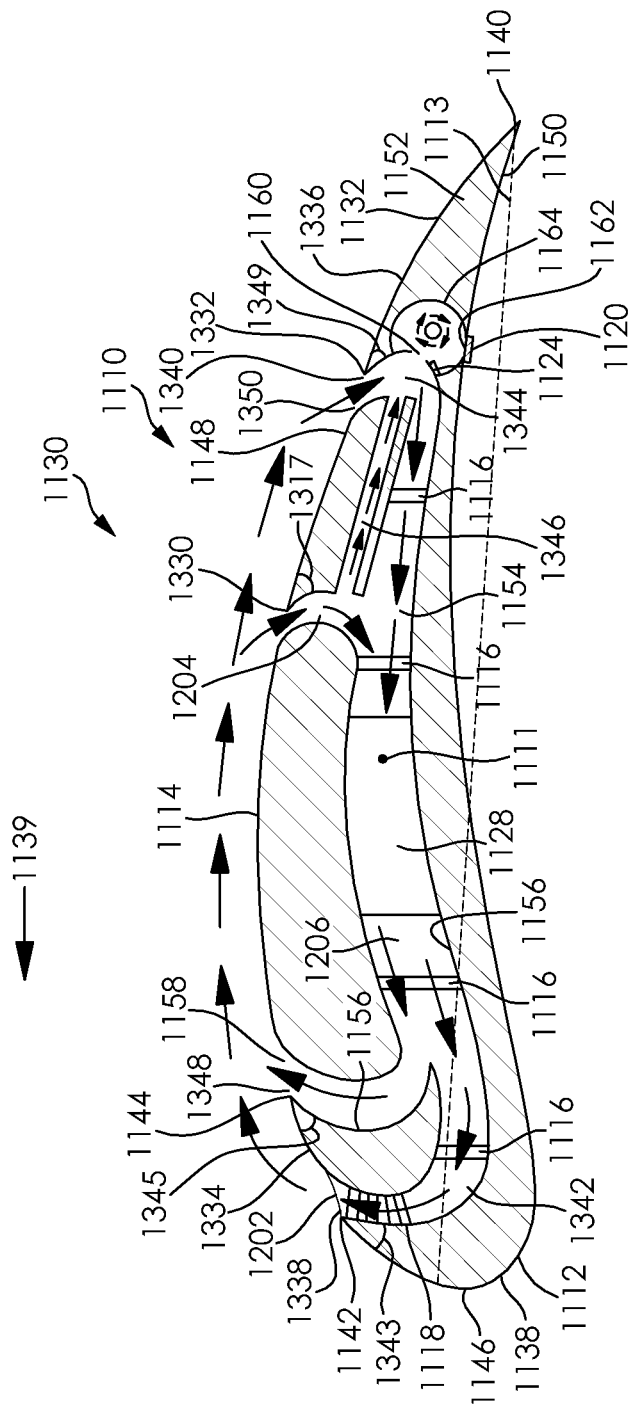
FIG. 13 is a cross-sectional view of a fifth example fluid system subjected to a fluid flow field and taken along a plane that is orthogonal to the lengthwise axis of the fluid system. The first panel is illustrated in the closed configuration and the second panel is illustrated in the open configuration.

FIG. 13 illustrates another example fluid system 1110. The fluid system 1110 is similar to the fluid system 10 illustrated in FIGS. 1, 2, 3, 4, 5, and 6 and described above, except as detailed below. The fluid system 1110 has a lengthwise axis 1111, a chord length 1113, a first body portion 1112, a second body portion 1114, a plurality of supports 1116, a spacer 1118, a first panel 1120, a second panel 1124, and a fluid pressurizer 1128. In the illustrated embodiment, the fluid system 1110 is included on the airfoil 1130 of a wing 1132 of an aircraft.

In the illustrated embodiment, the first body portion 1112 has a leading edge 1138, a trailing edge 1140, a first intermediate edge 1142, a second intermediate edge 1144, a third intermediate edge 1330, a fourth intermediate edge 1332, a first front surface 1146, a second front surface 1334, a first rear surface 1148, a second rear surface 1336, a bottom surface 1150, and a main body 1152 that defines a recess 1154, an inner surface 1156, a first opening 1158, a second opening 1160, a third opening 1162, a fourth opening 1338, a fifth opening 1340, a first passageway 1342, a second passageway 1344, a third passageway 1346, and a cavity 1164. In addition, the first body portion 1112 and the second body portion 1114 cooperatively define a first injection opening 1202, a second injection opening 1348, a first suction opening 1204, a second suction opening 1350, and a channel 1206.

The first intermediate edge 1142 is disposed between the leading edge 1138 and the trailing edge 1140, the second intermediate edge 1144 is disposed between the first intermediate edge 1142 and the third intermediate edge 1330, the third intermediate edge 1330 is disposed between the second intermediate edge 1142 and the fourth intermediate edge 1332, and the fourth intermediate edge 1332 is disposed between the third intermediate edge 1330 and the trailing edge 1140. The first intermediate edge 1142 defines a portion of the fourth opening 1338. The second intermediate edge 1144 and the third intermediate edge 1330 define the first opening 1158. The fourth intermediate edge 1332 defines a portion of the fifth opening 1340. The first front surface 1146 extends from the leading edge 1138 toward the trailing edge 1140 to the first intermediate edge 1142 and curves away from the chord length 1113. The second front surface 1334 extends from the fourth opening 1338 to the second intermediate edge 1142. The first rear surface 1148 extends from the third intermediate edge 1330 away from the leading edge 1138 to the fifth opening 1340 and curves toward the chord length 1113. The second rear surface 1336 extends from the fourth intermediate edge 1332 to the trailing edge 1140.

The first intermediate edge 1142 and the fourth opening 1338 cooperatively define the first injection opening 1202. The second intermediate edge 1144 and the second body portion 1114 cooperatively define the second injection opening 1348. The third intermediate edge 1330 and the second body portion 1114 cooperatively define the first suction opening 1204. The fourth intermediate edge 1332 and the fifth opening 1340 cooperatively define the second suction opening 1350. The first injection opening 1202 is disposed between the leading edge 1138 and the second injection opening 1348. The second injection opening 1348 is disposed between the first injection opening 1202 and the first suction opening 1204. The first suction opening 1204 is disposed between the second injection opening 1348 and the second suction opening 1350. The second suction opening 1350 is disposed between the first suction opening 1204 and the trailing edge 1140.

The channel 1206 extends from the second injection opening 1348 to the first suction opening 1204 such that the second injection opening 1348 is in communication with the first suction opening 1204. The first passageway 1342 extends from the first injection opening 1202 to the channel 1206 such that the first passageway 1342 is in communication with the channel 1206. The second passageway 1344 extends from the second suction opening 1350 to the channel 1206 such that the second passageway 1344 is in communication with the channel 1206. The third passageway 1346 extends from the channel 1206 to the second passageway 1344 such that the third passageway 1346 is in communication with the channel 1206 and the second passageway 1344. During movement of the fluid system 1110 in a forward direction, as shown by arrow 1139, fluid flows through the channel 1106 from the first suction opening 1204 and the second suction opening 1350, through the channel 1206, to the first injection opening 1202 and the second injection opening 1348. As shown in FIG. 13, the second opening 1160 and the cavity 1164 are positioned on the first body portion 1112 such that fluid that travels through the first suction opening 1204 and into the third passageway 1346 and into the second passageway 1344 and also through the second suction opening 1350 and into the channel 1206 toward the trailing edge 1140 and encounters the second opening 1160 and the cavity 1164 when the second panel 1124 is in the open configuration and before the fluid changes direction of travel toward the injection opening 1202 along the path of the channel 1206.

The first intermediate edge 1142 is disposed at an angle 1343 to the inner surface of the first passageway 1342. The second intermediate edge 1144 is disposed at an angle 1345 to the inner surface 1156 of the recess 1154. The third intermediate edge 1330 is defined at an angle 1347 to the inner surface 1156 of the recess 1154. The fourth intermediate edge 1332 is disposed at an angle 1349 to the inner surface 1156 of the second passageway 1344. In the illustrated embodiments, each of angles 1343, 1345, 1347, and 1349 is less than 90 degrees. While particular angles have been described, any suitable angle can be used between these features and selection of a suitable angle can be based on various considerations, such as the desired fluid flow around, or through, a fluid system. Example angles considered suitable include angles less than 90 degrees, angles less than 45 degrees, and any other angle considered suitable for a particular embodiment.

While the first body portion 1112 has been illustrated as defining the first passageway 1342, the second passageway 1344, and the third passageway 1346, any suitable portion of a fluid system can define a first passageway, a second passageway, and a third passageway. Selection of a suitable portion of a fluid system to define a first passageway, a second passageway, and/or a third passageway can be based on various considerations, such as the desired fluid flow through a channel defined by the fluid system. For example, a second body portion can define one, or all of, a first passageway, a second passageway, and/or a third passageway. Alternatively, a first passageway, a second passageway, and a third passageway can be defined by the main body that forms the first body portion and the second body portion in embodiments in which the first body portion and the second body portion are forms as a single element.

While fluid system 1110 has been illustrated as including a channel 1206, a first passageway 1342, a second passageway 1344, a third passageway 1346, a first injection opening 1202, a second injection opening 1348, a first suction opening 1204, and a second suction opening 1350, a fluid system can omit all, or some of these features. Selection of a suitable number of features to omit from a fluid system can be based on various considerations, such as the desired fluid flow through a channel defined by the fluid system. For example, a fluid system can include structure that defines a channel, a first passageway, a first injection opening, a second injection opening, and a first suction opening, such as those described herein. Alternatively, a fluid system can include structure that defines a channel, a second passageway, a first injection opening, a first suction opening, and a second suction opening, such as those described herein.

While the fluid system 1110 has been illustrated as including a first panel 1120, a first actuator 1122, a second panel 1124, a second actuator 1126, a second opening 1160, a third opening 1162, a cavity 1164, and a third passageway 1346, a fluid system can omit all, or some of these features. Selection of a suitable number of features to omit from a fluid system can be based on various considerations, such as the desired fluid flow through a channel defined by the fluid system. For example, a fluid system can omit a first panel, a first actuator, a second panel, a second actuator, a second opening, a third opening, a cavity, and a third passageway such that it includes a first injection opening, a second injection opening, a first suction opening, a second suction opening, and a channel.

Figure 14:
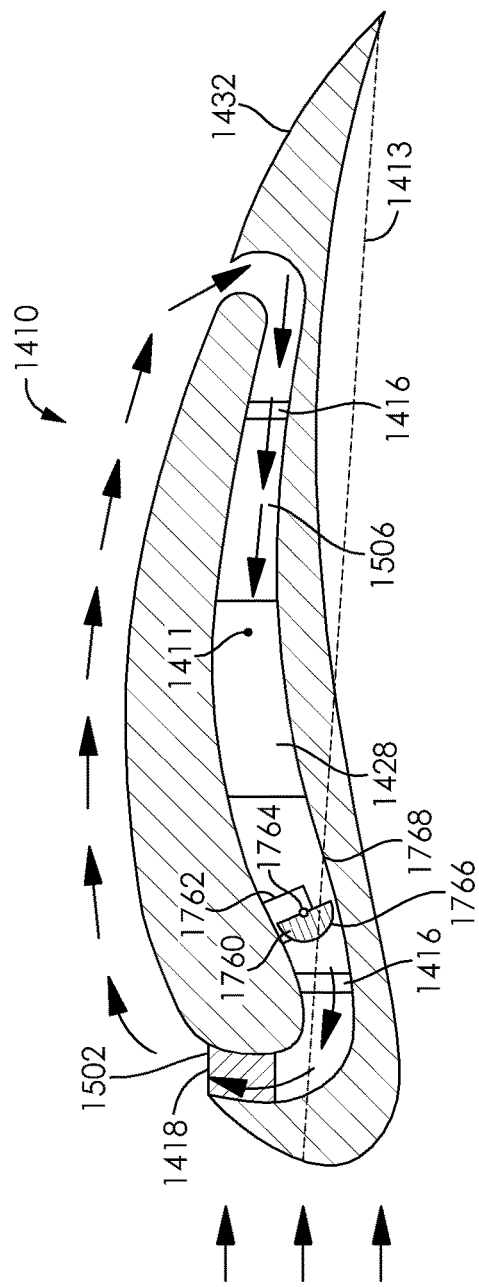
FIG. 14 is a cross-sectional view of a sixth example fluid system taken along a plane that is orthogonal to the lengthwise axis of the fluid system. The flow regulator is in a first position.
Figure 15:
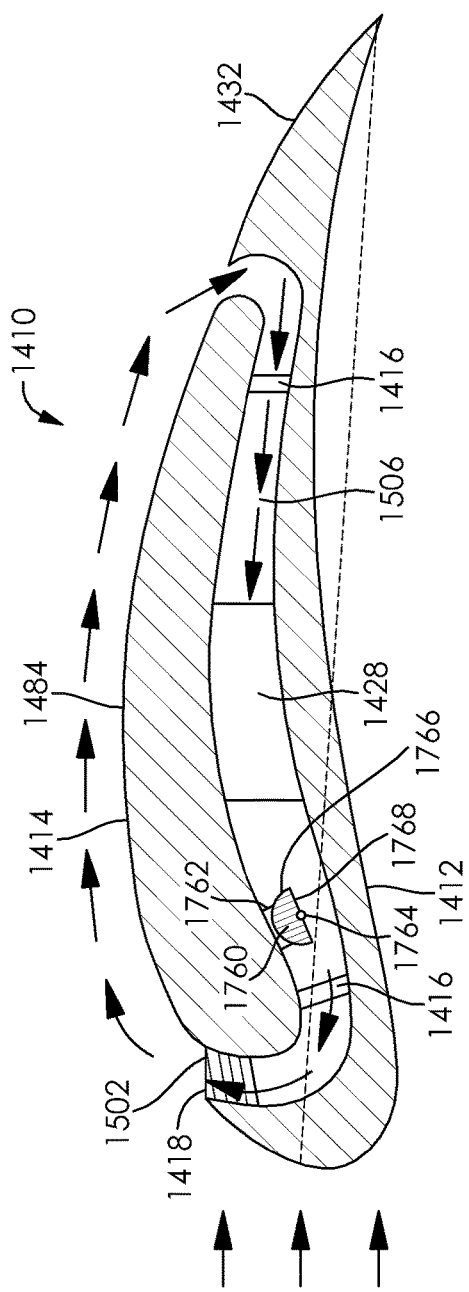
FIG. 15 is another cross-sectional view of the fluid system illustrated in FIG. 14 with the flow regulator in a second position.
Figure 16:
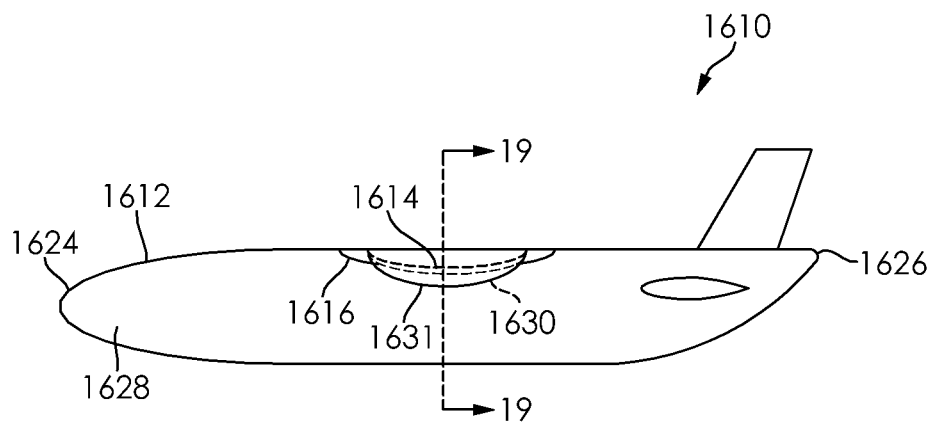
FIG. 16 is a side view of a first example rotatable wing system.
Figure 17:
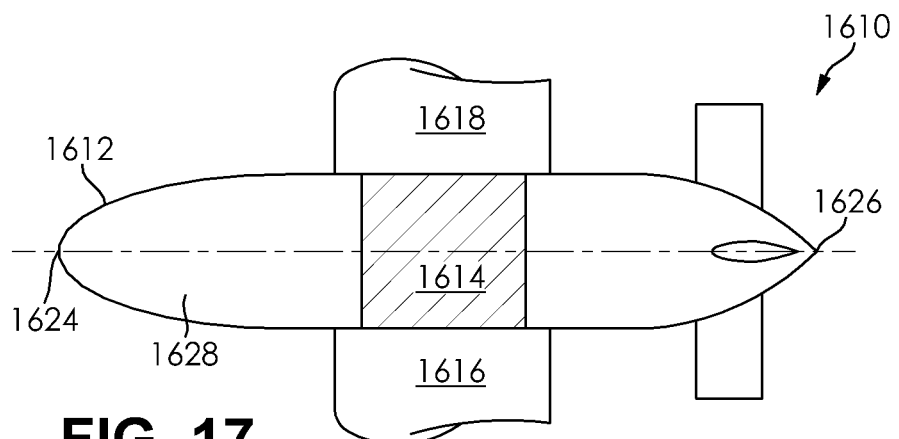
FIG. 17 is a partial top view of the rotatable wing system illustrated in FIG. 16.

FIGS. 14 and 15 illustrate another example fluid system 1410. The fluid system 1410 is similar to the fluid system 10 illustrated in FIGS. 1, 2, 3, 4, 5, and 6 and described above, except as detailed below. The fluid system 1410 has a lengthwise axis 1411, a chord length 1413, a first body portion 1412, a second body portion 1414, a plurality of supports 1416, a spacer 1418, and a fluid pressurizer 1428.

In the illustrated embodiment, the fluid system 1410 is included on the airfoil 1430 of a wing 1432 of an aircraft.

In the illustrated embodiment, the fluid system 1410 includes a fluid regulator 1760 disposed within the channel 1506 that is moveable between a first position, as shown in FIG. 14, and a second position, as shown in FIG. 15. In the first position, the fluid regulator 1760 prevents fluid from flowing through the channel 1506. In the second position, the fluid regulator 1760 allows fluid to pass through the channel 1506. A fluid regulator included in a fluid system can comprise any suitable fluid regulator and selection of a suitable fluid regulator can be based on various considerations, such as the structural arrangement of a first body portion, a second body portion, or a channel cooperatively defined by a first body portion and a second body portion. Examples of fluid regulators considered suitable to include in a fluid system include electric motors that include attached structure (e.g., half cylinder) that moves between first and second positions to regulate fluid flow through a channel, regulators that produce rotational movement around the lengthwise axis of an attached shaft and that include attached structure (e.g., half cylinder) that moves between first and second positions to regulate fluid flow through a channel, regulators that produce axial movement of a shaft along the lengthwise axis of the shaft that include attached structure (e.g., half cylinder) that moves between first and second positions to regulate fluid flow through a channel, and any other regulator considered suitable for a particular embodiment. In the illustrated embodiment, the fluid regulator 1760 is an electric motor 1762 that has a shaft 1764 and a main body 1766 attached to the shaft 1764 that defines a half cylinder 1768.

The fluid regulator 1760 is moveable between an off state, in which the fluid regulator 1760 is either positioned in the first position or the second position, and an on state, in which any structure attached to the fluid regulator 1760 moves relative to the channel 1506. The motor 1762 can be operatively connected to any suitable portion of the device, system, or component on which the fluid system is disposed to provide power to the fluid regulator 1760 (e.g., battery, electric motor) and to provide a mechanism for moving the fluid regulator 1760 between the off state and the on state (e.g., one or more switches).

Fluid flow through the channel 1506 is regulated based on the position of the fluid regulator 1760. For example, when the fluid regulator 1760 is in the off state and in the first position, as shown in FIG. 14, no fluid, or a minimum amount of fluid will pass through channel 1506. When the fluid regulator 1760 is in the off state and in the second position, as shown in FIG. 15, fluid can pass through channel 1506 and past the fluid regulator 1760. When the fluid regulator 1760 is in the on state, fluid will pass through channel 1506 in a pulsating manner based on the movement of the half cylinder 1768 within the channel 1506 between the first and second positions, as shown in FIGS. 14 and 15. The pulsating flow will be based on the revolutions per minute that the attached structure, half cylinder 1768, moves relative to the channel 1506 and can be set at a particular value or can vary depending on the desired fluid flow through the channel 1506 and out of the injection opening 1502. Pulsating flow is considered advantageous because it provides a mechanism for manipulating the flow of fluid out of the injection opening 1502 over the top surface 1484 of the second body portion 1414. The optimal pulsation frequency and duty cycle will be based on the flow conditions and airfoil geometry.

While a half cylinder 1768 has been illustrated as attached to a motor 1762, any suitable structure can be included on a fluid regulator to achieve pulsating flow as described herein. Selection of suitable structure to include on a fluid regulation can be based on various considerations, such as the structural arrangement of a first body portion, a second body portion, or a channel cooperatively defined by a first body portion and a second body portion. Examples of structures considered suitable to include on a fluid regulator to achieve pulsating flow as described herein include half cylinders, one or more blades, fan blades, elongate members, curved members, gates that move between first and second positions (e.g., via an oscillatory gear system) to open and close the channel, and any other structure considered suitable for a particular embodiment. Alternatively, any of the moveable spacers described herein can be used to achieve pulsating flow. For example, a spacer attached to an actuator can be moved between its first and second positions to create pulsating flow out of an injection opening. The pulsating flow will be based on the number of times per minute that the spacer moves between the first and second positions within the channel and can be set at a particular value or can vary depending on the desired fluid flow through the channel and out of the injection opening. In these embodiments, the pulsating fluid flow can be manipulated using a spacer actuator.

Any of the spacer configurations and associated structure that provides movement of a spacer, or plurality of spacers, illustrated herein can be included in any of the example embodiments illustrated and described herein and at any suitable location on a fluid system and selection of a suitable spacer configuration, associated structure, and location to position a spacer, or a plurality of spacers, on a fluid system can be based on various considerations, such as the desired fluid flow through a channel defined by the fluid system. For example, any of the spacer configurations and associated structure that provides movement of a spacer, or plurality of spacers, illustrated herein can be disposed on a fluid system at a suction opening in combination with, or exclusive of, any spacer configuration and associated structure that provides movement of a spacer, or plurality of spacers, at an injection opening.

While the example fluid systems described herein have been illustrated as being included on a wing of an aircraft that has a constant chord length with no sweep angle, a fluid system, such as those described herein can be included in any suitable structure, device, and/or system. Selection of a suitable structure, device, and/or system to include a fluid system can be based on various considerations, such as the intended use of the structure, device, and/or system. Examples of structures, devices, and/or systems considered suitable to include a fluid system, such as those described herein, include aircraft, unmanned reconnaissance aircrafts, small person aircrafts, commercial airlines, wings of aircrafts, wings of aircrafts that have a varying chord length and/or sweep angle, wings of aircraft that are tapered, space shuttles, space exploratory aircrafts, exploratory aircrafts, airplanes, helicopters, rotorcraft rotor blades, vehicles, automobiles, cars, trucks, motorcycles, boats, locomotives, projectiles, turbines, wind turbines, blades of wind turbines, gas turbine engines, gas turbine engine compressors and/or fans, pumps, propellers, blades, sails, any structure, device, and/or system that uses airfoils, land vehicles, water vehicles, air vehicles, any structure, device, and/or system that is used to generate lift and/or thrust, and any other structure, device, and/or system considered suitable. For example, the fluid systems described herein can be advantageously used for exploratory missions to other planets, such as flights in the Martian atmosphere. This is considered advantageous at least due to the reduced energy consumption, enhanced lift, reduced drag, generated thrust, increased cruise aerodynamic efficiency, enhanced maneuverability and safety, and reduced take off/landing distance required for structures, devices, and/or systems that include a fluid system, such as those described herein.

Any of the herein described examples of fluid systems, and any of the features described relative to a particular example of a fluid system, can be included along a portion, or the entirety, of the span of a wing, blade, or other feature of a device, system, component (e.g., transportation vehicle) in which it is desired to include a fluid system. For example, a first opening, a second opening, a third opening, a fourth opening, a fifth opening, a cavity, a first track, a second track, a first panel, a second panel, a first injection opening, a second injection opening, a first suction opening, a second suction opening, a channel, a first passageway, a second passageway, third passageway, and/or a fluid regulator of a fluid system can extend along a portion, or the entirety, of the span of a wing, blade, or other feature in which it is desired to include a fluid system. Alternatively, a fluid system can include a plurality of discrete combinations of features and elements that include structure similar to the first openings, the second openings, the third openings, the fourth openings, the fifth openings, the cavities, the first tracks, the second tracks, the first panels, the second panels, the first injection openings, the second injection openings, the first suction openings, the second suction openings, the channels, the first passageways, the second passageways, the third passageways, and/or the fluid regulators described herein. For example, each discrete combination of a first opening, a second opening, a third opening, a fourth opening, a fifth opening, a cavity, a first track, a second track, a first panel, a second panel, a first injection opening, a second injection opening, a first suction opening, a second suction opening, a channel, a first passageway, a second passageway, third passageway, and/or a fluid regulator described herein can be in communication with a separate fluid pressurizer (e.g., pump) and can be separately operable by a user of a fluid system (e.g., using switches).

FIGS. 16, 17, 18, and 19 illustrate a first example rotatable wing system 1610. The rotatable wing system 1610 includes a fuselage 1612, a wing box 1614, a first wing 1616, and a second wing 1618.

Figure 19:
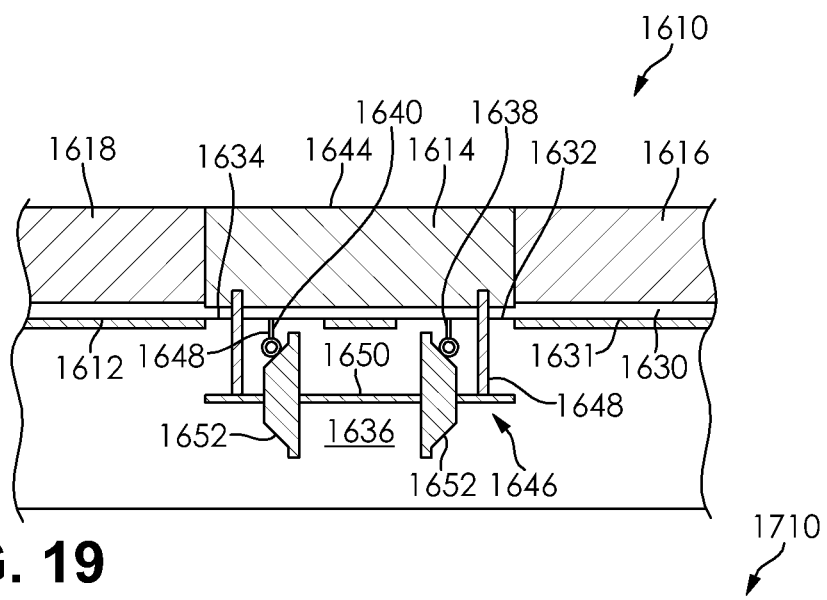
FIG. 19 is a partial section view of the rotatable wing system illustrated in FIG. 16 taken along line 19-19.

The fuselage 1612 has a front end 1624, a rear end 1626, and a main body 1628 that defines a recess 1630, a recess base 1631, a first slot 1632, a second slot 1634, a fuselage chamber 1636, a first rail 1638, and a second rail 1640. The recess 1630 is disposed between the front end 1624 and the rear end 1626 and extends into the main body 1628 of the fuselage 1612 from a top surface of the fuselage 1612. In the illustrated embodiment, the recess 1630 defines a partial cylinder. However, alternative embodiments can define any suitable structural arrangement, such as partial ellipsoids, complete cylinders, complete ellipsoids, and any other configuration considered suitable for a particular embodiment. As best shown in FIG. 19, each of the first slot 1632 and the second slot 1634 are disposed within the recess 1632 and provide access to the fuselage chamber 1636. Each of the first slot 1632 and the second slot 1634 is sized and configured to receive a portion of an attachment track 1646, as described in more detail herein. In the illustrated embodiment, the fuselage chamber 1636 is an enclosed space that is separated from other parts of the fuselage (e.g., passenger cabin, storage cabin). Alternative embodiments, however, can include a fuselage chamber that is not separated from other chambers of the fuselage. As best shown in FIG. 19, each of the first rail 1638 and the second rail 1640 are disposed within the fuselage chamber 1636, extend along the recess base 1631, and are sized and configured to interact with the plurality of wheels 1652 of the attachment track 1646, as described in more detail herein.

The wing box 1614 has a main body 1644 and is rotatably attached to the fuselage 1612 by an attachment track 1646. In the illustrated embodiment, the wing box 1614 defines a partial cylinder that mirrors the configuration of recess 1630 and is sized and configured to be partially disposed with the recess 1630. However, alternative embodiments can include a wing box that does not mirror the configuration of a recess defined by a fuselage and/or that defines a partial ellipsoids, complete cylinder, complete ellipsoids, and any other configuration considered suitable for a particular embodiment. The main body 1644 is attached to each of the first wing 1616 and the second wing 1618 and can include any suitable structure to attach the wings 1616, 1618 to the wing box (e.g., one or more spars). The attachment track 1646 has a plurality of attachment bars 1648, a plurality of axles 1650, and a plurality of wheels 1652. A first set of the plurality of bars 1648 extends through the first slot 1632 and a second set of the plurality of bars 1648 extends through the second slot 1634. Each bar of the plurality of bars 1648 has a first end attached to the wing box 1614 and a second end that is attached to an axle of the plurality of axles 1652. A first wheel and a second wheel of the plurality of wheels 1652 are rotatably disposed on each axle of the plurality of axles 1650. The first wheel is in contact with the first rail 1638 and the second wheel is in contact with the second rail 1640. This structural arrangement provides a mechanism for rotating each of the wing box 1614, the first wing 1616, and the second wing 1618 relative to the fuselage 1612. Optionally, a rotatable wing system can include one or more mechanisms for sealing the seam between a fuselage and a wing box (e.g., saw teeth seal, labyrinth seal).

Figure 18:
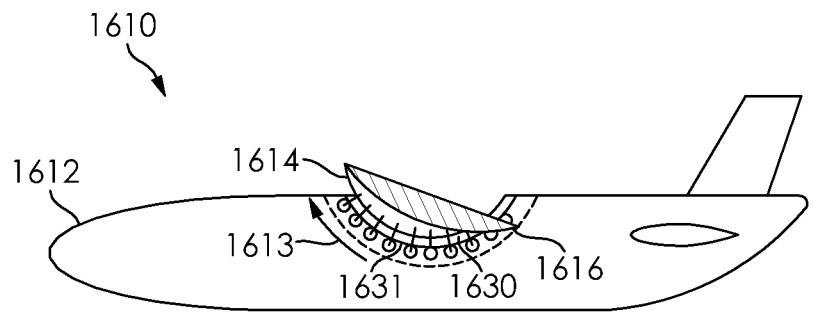
FIG. 18 is a partial cross-sectional view of the rotatable wing system illustrated in FIG. 16 taken along a plane that is parallel to the lengthwise axis of the fuselage.

In the illustrated embodiment, movement of the wing box 1614, and attached wings 1616, 1618 in a clockwise direction, as shown by arrow 1613 in FIG. 18, increases the angle of attack without rotating the fuselage 1612 and movement of the wing box 1614, and attached wings 1616, 1618 in a counterclockwise direction, opposite that of arrow 1613, decreases the angle of attack without rotating the fuselage 1612 and allows for deceleration of the aircraft. The rotatable wing system 1610 is considered advantageous at least because it provides a mechanism for rotating the wing box 1614, and the attached wings 1616, 1618, to any suitable degree relative to the fuselage 1612. For example, a wing box, and attached wing(s), can be rotated between about 0 degrees and about 90 degrees relative to the lengthwise axis of a fuselage, between about 0 degrees and about 180 degrees relative to the lengthwise axis of the fuselage, between about 0 degrees and about 270 degrees relative to the lengthwise axis of the fuselage, between about 0 degrees and about 360 degrees relative to the lengthwise axis of the fuselage, less than 45 degrees, about 90 degrees, about −90 degrees, and any other degree of movement considered suitable for a particular embodiment.

Movement of the attachment track 1646 relative to the fuselage 1612 can be accomplished using any suitable technique or method of accomplishing movement and selection of a suitable technique or method can be based on various considerations, such as the materials forming the rotatable wing system. Examples of technique and methods of accomplishing movement of an attachment track relative to a fuselage include attaching a motor to an attachment track that can be activated using one or more switches, attaching more than one motor to an attachment track that can be activated using one or more switches, attaching a motor to each wheel, or set of wheels, of an attachment track that can be activated using one or more switches, and any other technique or method considered suitable for a particular embodiment.

While movement of a wing box relative to a fuselage has been illustrated as being accomplished using rails, axles, and wheels, any suitable system, device, and/or feature can be included on a rotatable wing system to accomplish movement of a wing box relative to a fuselage. Selection of a suitable system, device, and/or feature to include in a rotatable wing system can be based on various considerations, including the intended use of the aircraft. For example, alternative embodiments can include electromagnets that can produce magnetic levitation.

The fuselage 1612, the wing box 1614, the first wing 1616, the second wing 1618, and the attachment track 1646 can be formed of any suitable material and manufactured using any suitable technique or method. Selection of a suitable material to form, and a suitable technique or method to manufacture, a fuselage, a wing box, a first wing, a second wing, and an attachment track can be based on various considerations, including the intended use of the system. Examples of materials considered suitable to form a fuselage, a wing box, a first wing, a second wing, and an attachment track include conventional materials, metals, steel, alloys, plastics, combinations of metals and plastics, composite materials, and any other material considered suitable for a particular embodiment. Example techniques and methods considered suitable to manufacture a fuselage, a wing box, a first wing, a second wing, and an attachment track include convention methods and techniques, injection molding, machining, 3D printing, and/or any other method or technique considered suitable for a particular embodiment.

While the rotatable wing system 1610 has been illustrated as included a first wing 1616 and a second wing 1618 and the attachment track 1646 has been illustrated as including a plurality of attachment bars 1648, a plurality of axles 1650, and a plurality of wheels 1652, a rotatable wing system can include any suitable number of wings and an attachment track can include any suitable number of bars, axles, and/or wheels. Selection of a suitable number of wings to include in a rotatable wing system and of a suitable number of bars, axles, and wheels to include in an attachment track can be based on various considerations, including the intended use of the aircraft. Examples of numbers of wings, bars, axles, and wheels considered suitable to include in a rotatable wing system include one, at least one, two, a plurality, three, four, five, six, more than six, and any other number considered suitable for a particular embodiment.

Figure 20:
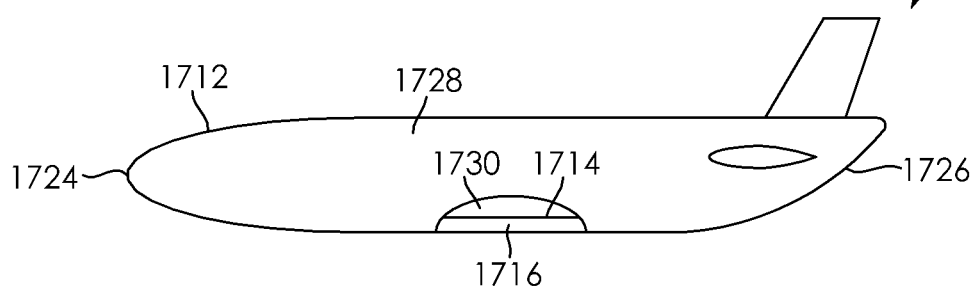
FIG. 20 is a side view of a second example rotatable wing system.

FIG. 20 illustrates a second example rotatable wing system 1710. The rotatable wing system 1710 is similar to the rotatable wing system 1610 illustrated in FIGS. 16, 17, 18, and 19 and described above, except as detailed below. The rotatable wing system 1710 includes a fuselage 1712, a wing box 1714, and a first wing 1716.

In the illustrated embodiment, the recess 1730 is disposed between the front end 1724 and the rear end 1726 and extends into the main body 1728 of the fuselage 1712 from a bottom surface of the fuselage 1712. In the illustrated embodiment, the recess 1730 and the wing box 1714 define partial ellipsoids.

Figure 21:
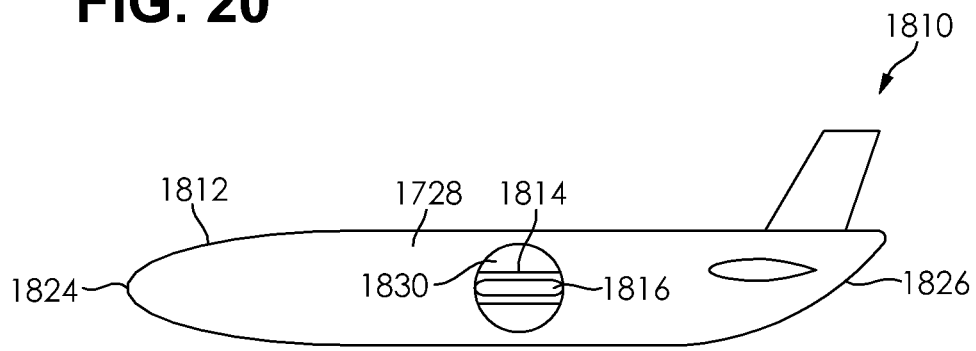
FIG. 21 is a side view of a third example rotatable wing system.

FIG. 21 illustrates a third example rotatable wing system 1810. The rotatable wing system 1810 is similar to the rotatable wing system 1610 illustrated in FIGS. 16, 17, 18, and 19 and described above, except as detailed below. The rotatable wing system 1810 includes a fuselage 1812, a wing box 1814, and a first wing 1816.

In the illustrated embodiment, the fuselage 1812 defines a passageway 1830 that extends through the fuselage 1812 is disposed between the front end 1824 and the rear end 1826. The passageway 1830 extends into the main body 1828 of the fuselage 1812 from a first side of the fuselage 1812 to a second side of the fuselage 1812. In the illustrated embodiment, the recess 1830 defines a cylindrical structure within which the wing box 1814 is disposed and rotatably attached. In this embodiment, the slots and rails (not shown) extend about the entire circumference of the passageway 1830 such that the wing 1816 can rotate 360 degrees.

Any of the herein described rotatable wing systems (e.g., rotatable wing system 1610, rotatable wing system 1710, rotatable wing system 1810) can include one or more wings that include a fluid system, such as fluid system 10, fluid system 210, fluid system 510, fluid system 810, fluid system 1110, fluid system 1410, variations of the fluid systems described herein, and any other fluid system considered suitable for a particular embodiment.

It is considered advantageous to include a rotatable wing system, such as those described herein, on an aircraft at least because it allows for the wing(s) of an aircraft to be rotated and achieve take off and/or landing without rotating the entire airframe. In addition, the rotatable wing systems described herein allow for the wing(s) of any aircraft to be rotated any suitable degree relative to a fuselage to maximize efficiency during take off, flight, and/or landing.

FIGS. 22, 23, 24, 25, and 26 illustrate another example fluid system 1910. The fluid system 1910 is similar to the fluid system 10 illustrated in FIGS. 1, 2, 3, 4, 5, and 6 and described above, except as detailed below. The fluid system 1910 has a lengthwise axis 1911, a chord length 1913, a first body portion 1912, a second body portion 1914, a plurality of supports 1916, a plurality of spacers 1918, a first panel 1920, a first actuator 1922, a second panel 1924, a second actuator 1926, a third panel 2110, a third actuator 2112, a fourth panel 2114, a fourth actuator 2116, a fifth panel 2118, and a fifth actuator 2120. In the illustrated embodiment, the fluid system 1910 is included on the airfoil 1930 of a wing 1932 and provides a plurality of discrete openings, as described in more detail herein, for disposing of debris that accumulates within cavity 1964.

The first body portion 1912 has a root 1935, a tip 1937, and a main body 1952 that defines a recess 1954, an inner surface 1956, a first opening 1958, a second opening 1960, a third opening 1962, a cavity 1964, a fourth opening 2122, a fifth opening 2124, and a sixth opening 2126. The second opening 1960 is defined on a portion of a curved surface of the inner surface 1956 within recess 1954, between the rear surface 1948 and the bottom surface 1950, and provides access between the channel 2006 and the cavity 1964. Each of the third opening 1962 and the fourth opening 2122 is defined on the bottom surface 1950 and provides access between the cavity 1964 and an environment exterior to the first body portion 1912. The third opening 1962 is defined between the root 1935 and the tip 1937 and the fourth opening 2122 is defined between the third opening 1962 and the tip 1937. The fifth opening 2124 is defined at the root 1935 and the sixth opening 2126 is defined at the tip 1937 and provides access between the cavity 1964 and an environment exterior to the first body portion 1912. The cavity 1964 is disposed between the rear surface 1948 and the bottom surface 1950 and is sized and configured to receive fluid that travels into channel 2006 and debris that enters into the channel 2006 during movement of the fluid system 1910 through a fluid. In the illustrated embodiment, the cavity 1964 has a circular cross-sectional configuration that advantageously allows debris to accumulate within the cavity 1964 during movement of the fluid system 1910 through a fluid when the second opening 1960 is open and each of the third opening 1962, fourth opening 2122, fifth opening 2124, and sixth opening 2126 is closed. Debris (e.g., water and/or sand) accumulates in the cavity 1964 because it has a higher density than the fluid (e.g., air) through which it is travelling and higher centrifugal forces will be applied to the debris based on the structural arrangement (e.g., curved, non-linear structural arrangement) of the first body portion 1912 and the second body portion 1914 and the structural arrangement of the channel 2006 (e.g., the channel 2006 curves from the suction opening 2004 toward the injection opening 2002 at angle between about 10 degrees and about 180 degrees). While the fluid system 1910 has been described as a wing 1932 of an aircraft travelling through air, a fluid system can travel through any suitable fluid and debris can be any debris that is disposed within the fluid.

Maintaining the position of a panel, such as the first panel 1920, the second panel 1924, the third panel 2110, the fourth panel 2114, and the fifth panel 2118, during use can be accomplished using any suitable structure having any suitable structural arrangement that is capable of maintaining the position of a panel and allowing movement of the panel. Selection of a suitable structure can be based on various considerations, such as the structural arrangement of a first body portion and/or the structural arrangement of a second body portion. Examples of structures considered suitable to include in a fluid system to maintain the position of a panel and allow movement of the panel include brackets, rails, recessed grooves, tracks, actuators, rotatable actuators, and any other structure considered suitable for a particular embodiment.

Figure 22:
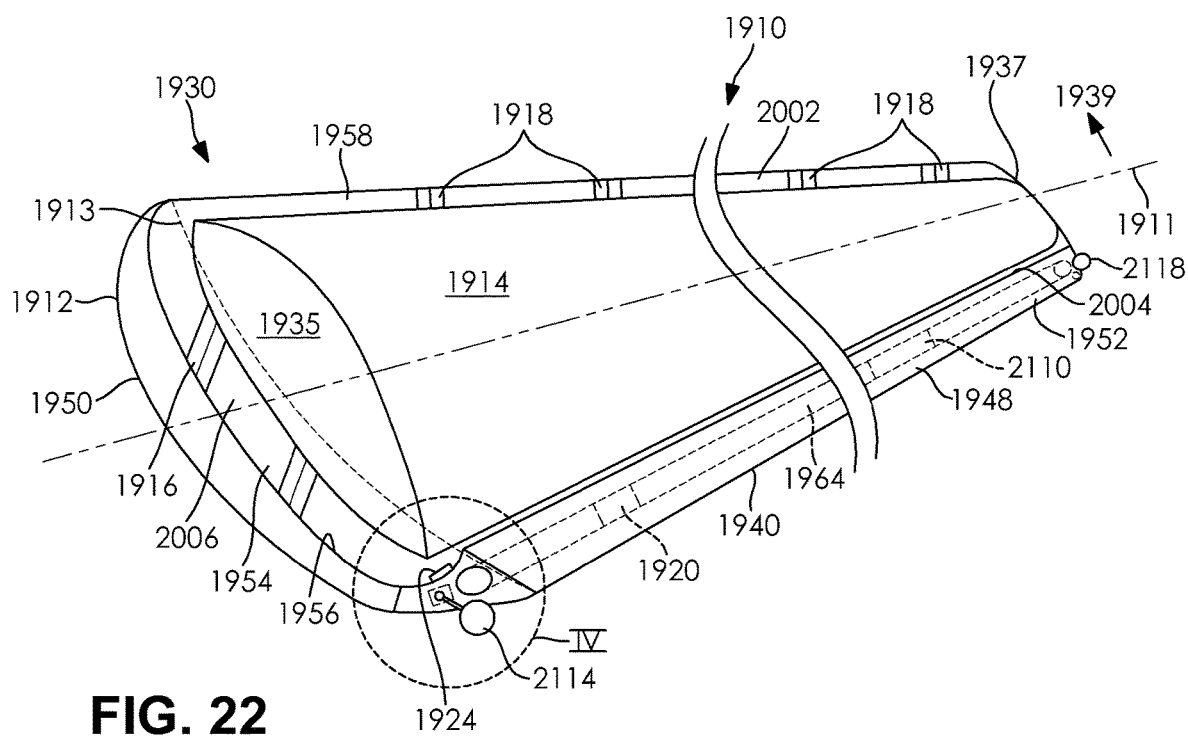
FIG. 22 is a partial perspective view of a seventh example fluid system.
Figure 23:
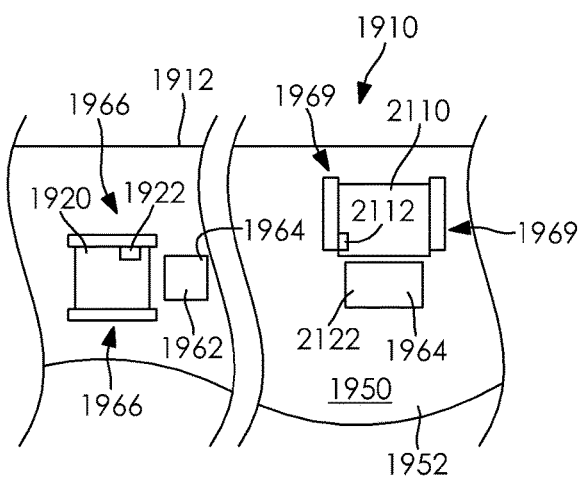
FIG. 23 is a partial perspective view of a portion of the first body portion of the fluid system illustrated in FIG. 22.
Figure 24:
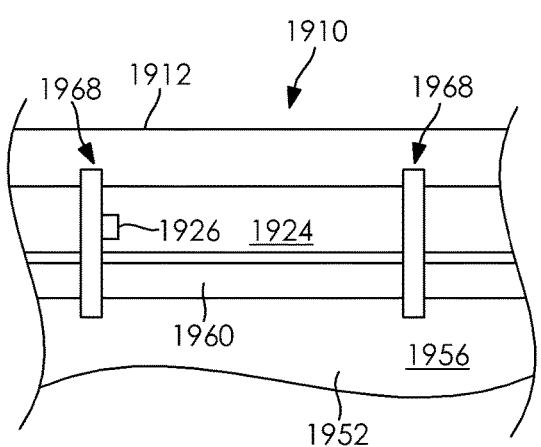
FIG. 24 is a partial perspective view of another portion of the first body portion of the fluid system illustrated in FIG. 22.

As shown in FIGS. 23 and 24, the first body portion 1912 includes a first track 1966, a second track 1968, and a third track 1969 that are each sized and configured to maintain the position of a panel and allow movement of the panel. As shown in FIG. 23, the first panel 1920 is moveably attached to the first body portion 1912 via the first track 1966 and the first actuator 1922 and the third panel 2110 is moveably attached to the first body portion 1912 via the third track 1969 and the third actuator 2112. Each of the first panel 1920, the first track 1966, the first actuator 1922, the third panel 2110, third track 1969, and third actuator 2112 is disposed outside of the cavity 1964 and on the bottom surface 1950 of the first body portion 1912. However, as described herein, a panel, track, actuator, and other associated components, can be disposed within a cavity. Each of the first panel 1920 and third panel 2110 has a closed configuration, as shown in FIG. 22, and an open configuration, as shown in FIG. 23. The first panel 1920 is moveable between the open and closed configurations via the first actuator 1922. In the closed configuration, the first panel 1920 is disposed over the third opening 1962 (e.g., completely covers the third opening 1962) and in the open configuration the first panel 1920 allows fluid to pass through the third opening 1962. The third panel 2110 is moveable between the open and closed configurations via the third actuator 2112. In the closed configuration, the third panel 2110 is disposed over the fourth opening 2122 (e.g., completely covers the fourth opening 2122) and in the open configuration the third panel 2110 allows fluid to pass through the fourth opening 2122.

In the off state, the first actuator 1922 maintains its position such that the first panel 1920 maintains its position relative to the first body portion 1912. In the open state, the first actuator 1922 moves such that the first panel 1920 moves in a first direction and fluid and/or debris disposed within the cavity 1964 can pass through the third opening 1962 and into an environment exterior to the cavity 1964. In the close state, the first actuator 1922 moves such that the first panel 1920 moves in a second direction, opposite that of the first direction, and fluid and/or debris disposed within the cavity 1964 can accumulate within the cavity 1964 and does not pass through the third opening 1962. In the off state, the third actuator 2112 maintains its position such that the third panel 2110 maintains its position relative to the first body portion 1912. In the open state, the third actuator 2112 moves such that the third panel 2110 moves in a first direction and fluid and/or debris disposed within the cavity 1964 can pass through the fourth opening 2122 and into an environment exterior to the cavity 1964. In the close state, the third actuator 2112 moves such that the third panel 2110 moves in a second direction, opposite that of the first direction, and fluid and/or debris disposed within the cavity 1964 can accumulate within the cavity 1964 and does not pass through the fourth opening 2122.

As shown in FIG. 24, the second panel 1924 is moveably attached to the first body portion 1912 via the second track 1968 and the second actuator 1926. Each of the second panel 1924, second track 1968, and second actuator 1926 is disposed outside of the cavity 1964 and within the channel 1954. However, as described herein, a panel, track, actuator, and other associated components, can be disposed within a cavity. The second panel 1924 has a closed configuration, not shown, and an open configuration, as shown in FIG. 24, and is moveable between these configurations via the second actuator 1926. In the closed configuration, the second panel 1922 is disposed over the second opening 1960 (e.g., completely covers the second opening 1960) and in the open configuration the second panel 1924 allows fluid to pass through the second opening 1960.

In the off state, the second actuator 1926 maintains its position such that the second panel 1924 maintains its position relative to the first body portion 1912. In the open state, the second actuator 1926 moves such that the second panel 1924 moves in a first direction such that fluid and/or debris travelling through the channel 2006 can enter the cavity 1964 defined by the first body portion 1912 and, if each of the first panel 1920, third panel 2110, fourth panel 2114, and fifth panel 2118 is closed, accumulate in the cavity 1964. Alternatively, if one, or more than one, of the first panel 1920, third panel 2110, fourth panel 2114, and fifth panel 2118 is open, the fluid and/or debris can pass through the second opening 1960 and into an environment exterior to the channel 2006 and the cavity 1964. In the close state, the second actuator 1926 moves such that the second panel 1924 moves in a second direction such that fluid and/or debris travelling through the channel 2006 does not enter the cavity 1964 and travels past the second panel 1924 and exits through the injection opening 2002.

Figure 25:
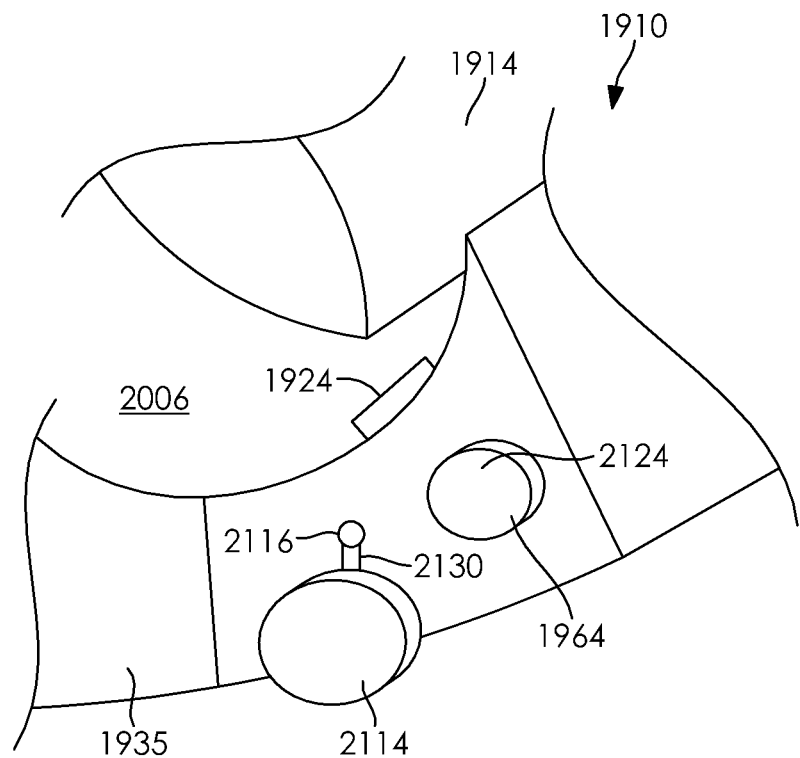
FIG. 25 is a magnified view of area IV illustrated in FIG. 22.
Figure 26:
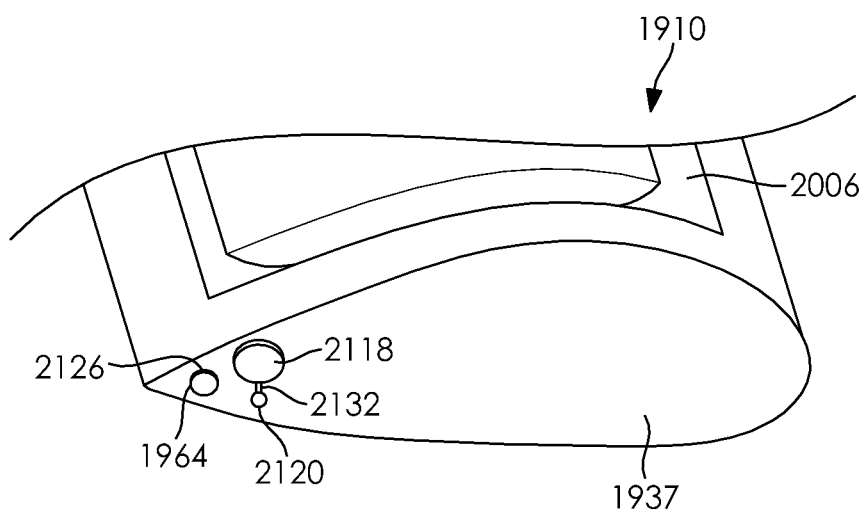
FIG. 26 is a partial perspective view of the tip of the first body portion of the fluid system illustrated in FIG. 22.

As shown in FIGS. 22, 25, and 26, the fourth panel 2114 is moveably attached to the first body portion 1912 via a shaft 2130 attached to the fourth actuator 2116 and the fifth panel 2118 is moveably attached to the first body portion 1912 via a shaft 2132 attached to the fifth actuator 2120. The fourth panel 2114 is rotatably disposed outside of the cavity 1964 on the root 1935 of the first body portion 1912 and the fifth panel 2118 is rotatably disposed outside of the cavity 1964 on the tip 1937 of the first body portion 1912. However, as described herein, a panel, track, actuator, and other associated components, can be disposed within a cavity. Each of the fourth panel 2214 and fifth panel 2118 has a closed configuration, not shown, and an open configuration, as shown in FIGS. 22, 25, and 26. The fourth panel 2114 is moveable between the open and closed configurations via the fourth actuator 2116. In the closed configuration, the fourth panel 2114 is disposed over the fifth opening 2124 (e.g., completely covers the fifth opening 2124) and in the open configuration the fourth panel 2114 allows fluid to pass through the fifth opening 2124. The fifth panel 2118 is moveable between the open and closed configurations via the fifth actuator 2120. In the closed configuration, the fifth panel 2118 is disposed over the sixth opening 2126 (e.g., completely covers the sixth opening 2126) and in the open configuration the fifth panel 2118 allows fluid to pass through the sixth opening 2126.

In the off state, the fourth actuator 2116 maintains its position such that the fourth panel 2114 maintains its position relative to the first body portion 1912. In the open state, the fourth actuator 2116 moves such that the fourth panel 2114 moves in a first direction and fluid and/or debris disposed within the cavity 1964 can pass through the fifth opening 2124 and into an environment exterior to the cavity 1964. In the close state, the fourth actuator 2116 moves such that the fourth panel 2114 moves in a second direction, opposite that of the first direction, and fluid and/or debris disposed within the cavity 1964 can accumulate within the cavity 1964 and does not pass through the fifth opening 2124. In the off state, the fifth actuator 2120 maintains its position such that the fifth panel 2118 maintains its position relative to the first body portion 1912. In the open state, the fifth actuator 2120 moves such that the fifth panel 2118 moves in a first direction and fluid and/or debris disposed within the cavity 1964 can pass through the sixth opening 2126 and into an environment exterior to the cavity 1964. In the close state, the fifth actuator 2120 moves such that the fifth panel 2118 moves in a second direction, opposite that of the first direction, and fluid and/or debris disposed within the cavity 1964 can accumulate within the cavity 1964 and does not pass through the sixth opening 2126.

While four panels 1920, 2110, 2114, 2118 and four openings 1962, 2122, 2124, 2126 have been illustrated as providing access to between the cavity 1964 and an environment exterior to the cavity 1964, any suitable number of panels, having any suitable structural arrangement, can be included on a first body portion and the main body of a first body portion can define any suitable number of openings, having any suitable structural arrangement, providing access to between a cavity and an environment exterior to the cavity. Selection of a suitable number of panels to include on a first body portion and a suitable number of openings to define on a first body portion that provide access to between a cavity and an environment exterior to the cavity can be based on various considerations, including the structural arrangement of a channel defined between a first body portion and a second body portion. Examples of numbers of panels considered suitable to include on a first body portion to provide access to between a cavity and an environment exterior to the cavity include one, at least one, two, a plurality, three, four, five, six, seven, eight, nine, ten, more than ten, and any other number considered suitable for a particular embodiment. Examples of numbers of openings considered suitable for the main body of a first body portion to define to provide access to between a cavity and an environment exterior to the cavity include one, at least one, two, a plurality, three, four, five, six, seven, eight, nine, ten, more than ten, and any other number considered suitable for a particular embodiment. A panel included on a first body portion and an opening defined by the main body of a first body portion can have any suitable length along the span of the first body portion (e.g., about the length of the wing span, half of the wing span, one quarter of the wing span, less than one quarter of the wing span, one eighth of the wing span, less than one eighth of the wing span) and any suitable width and thickness considered suitable for a particular embodiment. An opening defined by the main body of a first portion that provides access to a cavity can always include an associated panel that is moveable between open and closed configurations, as described herein, or an opening defined by the main body of a first portion that provides access to a cavity can be free of a panel that is moveable, as described herein.

While a second panel 1924 and a second opening 1960 have been illustrated as providing access between the channel 2006 and the cavity 1964, any suitable number of panels, having any suitable structural arrangement, can be included on a first body portion and the main body of a first body portion can define any suitable number of openings, having any suitable structural arrangement, providing access to between a channel and a cavity. Selection of a suitable number of panels to include on a first body portion and a suitable number of openings to define on a first body portion that provide access to between a channel and a cavity can be based on various considerations, including the structural arrangement of a channel defined between a first body portion and a second body portion. Examples of numbers of panels considered suitable to include on a first body portion to provide access to between a channel and a cavity include one, at least one, two, a plurality, three, four, five, six, seven, eight, nine, ten, more than ten, and any other number considered suitable for a particular embodiment. Examples of numbers of openings that provide access to between a channel and a cavity considered suitable for the main body of a first body portion to define include one, at least one, two, a plurality, three, four, five, six, seven, eight, nine, ten, more than ten, and any other number considered suitable for a particular embodiment. A panel included on a first body portion and an opening defined by the main body of a first body portion can have any suitable length along the span of the first body portion (e.g., about the length of the wing span, half of the wing span, one quarter of the wing span, less than one quarter of the wing span, one eighth of the wing span, less than one eighth of the wing span) and any suitable width and thickness considered suitable for a particular embodiment.

While the cavity 1964 has been illustrated as being in communication with each of the second opening 1960, third opening 1962, fourth opening 2122, fifth opening 2124, and sixth opening 2126, a first body portion can define any suitable number of cavities such that each cavity is in communication with an opening providing access between a channel and the cavity and/or the cavity and an environment exterior to the cavity and channel. Selection of a suitable number of cavities for a first body portion to define can be based on various considerations, including the structural configuration of a channel defined by a fluid system. Examples of numbers of cavities considered suitable for a first body portion to define include one, at least one, two, a plurality, three, four, five, six, seven, eight, nine, ten, more than ten, and any other number considered suitable for a particular embodiment. In embodiments in which more than one cavity is defined by a first body portion, each cavity can have an associated first opening and first panel that allows or prevents fluid from entering the cavity from the channel, as described herein, and an associated second opening and second panel that allows or prevents fluid from exiting the cavity to an environment exterior to the cavity and the channel, as described herein.

In the illustrated embodiment, when the fluid system 1910 is moving in a forward direction, shown by arrow 1939, the fluid travels through the suction opening 2004 and into the channel 2006, travels toward the trailing edge 1940, and encounters the second opening 1960 and the cavity 1964 when the second panel 1924 is in the open configuration and before the fluid changes direction toward the injection opening 2002. Debris that has passed through the second opening 1960 accumulates in the cavity 1964 when each of the first panel 1920, the third panel 2110, the fourth panel 2114, and the fifth panel 2118 is in the closed configuration. To remove debris from the cavity 1964, one, a plurality, or all, of the first panel 1920, the third panel 2110, the fourth panel 2114, and the fifth panel 2118 can be moved to the open configuration such that the debris disposed within, or entering the cavity 1964 while the second panel 1922 is open, can pass through the opening disposed adjacent to the panel and into an environment external to the cavity 1964 and the fluid system 1910. Alternatively, debris can be removed from a cavity by moving a second panel to the closed configuration and a first panel, a third panel, a fourth panel, and/or a fifth panel to the open configuration such that the debris can pass through the opening adjacent to the panel and into an environment external to the cavity and a fluid system.

Those with ordinary skill in the art will appreciate that various modifications and alternatives for the described and illustrated embodiments can be developed in light of the overall teachings of the disclosure. Accordingly, the particular arrangements disclosed are intended to be illustrative only and not limiting as to the scope of the invention, which is to be given the full breadth of the appended claims and any and all equivalents thereof.

What is claimed is:

1. A fluid system comprising:
   a main body having a leading edge, a trailing edge, an injection opening disposed between the leading edge and the trailing edge, a suction opening disposed between the injection opening and the trailing edge, a channel extending from the injection opening to the suction opening, a first opening, a second opening, and a cavity, the first opening providing access between the channel and the cavity, the second opening providing access between the cavity and an environment exterior to the cavity;
   a first panel moveably attached to the main body and moveable between an open configuration in which fluid can flow through the first opening and a closed configuration in which fluid is prevented from flowing through the first opening; and
   a second panel moveably attached to the main body and moveable between an open configuration in which fluid can flow through the second opening and a closed configuration in which fluid is prevented from flowing through the second opening.

2. The fluid system of claim 1, wherein the main body has a root and a tip; and
   wherein the second opening is defined on the root of the main body.

3. The fluid system of claim 2, wherein the main body defines a third opening on the tip of the main body, the third opening providing access between the cavity and an environment exterior to the cavity;
   further comprising a third panel moveably attached to the main body and moveable between an open configuration in which fluid can flow through the third opening and a closed configuration in which fluid is prevented from flowing through the third opening.

4. The fluid system of claim 1, wherein the main body has a root and a tip; and
   wherein the second opening is defined between the root and the tip.

5. The fluid system of claim 1, further comprising a spacer disposed within the channel, the spacer obstructing fluid flow through the channel.

6. The fluid system of claim 5, wherein the spacer is moveable between a first position and a second position, the spacer obstructing fluid flow through the channel in the first position.

7. The fluid system of claim 6, wherein the spacer partially obstructs fluid flow through the channel in the first position.

8. The fluid system of claim 6, wherein the spacer entirely obstructs fluid flow through the channel in the first position.

9. The fluid system of claim 1, wherein the spacer comprises a plurality of spacers disposed within the channel.

10. The fluid system of claim 1, further comprising a fluid pressurizer disposed within the channel.

11. The fluid system of claim 1, further comprising a first actuator operatively attached to the first panel and configured to move the first panel between the open configuration and the closed configuration.

12. The fluid system of claim 11, further comprising a second actuator operatively attached to the second panel and configured to move the second panel between the open configuration and the closed configuration.

13. The fluid system of claim 1, further comprising a fluid regulator disposed within the channel, the fluid regulator moveable between a first position that prevents fluid flow through the channel and a second position that allows fluid flow through the channel.

14. The fluid system of claim 1, wherein the main body defines a wing of an aircraft.

15. The fluid system of claim 14, further comprising a fuselage and a wing box attached to the fuselage;
   wherein the wing is attached to the wing box.

16. The fluid system of claim 15, wherein the wing box is rotatably attached to fuselage.

17. The fluid system of claim 16, wherein the fuselage has a lengthwise axis; and
   wherein the wing box is moveable between 0 degrees and 90 degrees relative to the lengthwise axis of the fuselage.

18. The fluid system of claim 1, wherein the main body is formed of a first body portion and a second body portion attached to the first body portion.

19. A fluid system comprising:
   a main body having a leading edge, a trailing edge, an injection opening disposed between the leading edge and the trailing edge, a suction opening disposed between the injection opening and the trailing edge, a channel extending from the injection opening to the suction opening, a first opening, a second opening, and a cavity, the first opening providing access between the channel and the cavity, the second opening providing access between the cavity and an environment exterior to the cavity;
a first panel moveably attached to the main body and moveable between an open configuration in which fluid can flow through the first opening and a closed configuration in which fluid is prevented from flowing through the first opening;
a second panel moveably attached to the main body and moveable between an open configuration in which fluid can flow through the second opening and a closed configuration in which fluid is prevented from flowing through the second opening;
a spacer disposed within the channel, the spacer obstructing fluid flow through the channel; and
a fluid pressurizer disposed within the channel.

20. A fluid system comprising:
a fuselage and a wing box rotatably attached to the fuselage;
a main body attached to the wing box, the main body having a leading edge, a trailing edge, an injection opening disposed between the leading edge and the trailing edge, a suction opening disposed between the injection opening and the trailing edge, a channel extending from the injection opening to the suction opening, a first opening, a second opening, and a cavity, the first opening providing access between the channel and the cavity, the second opening providing access between the cavity and an environment exterior to the cavity;
a first panel moveably attached to the main body and moveable between an open configuration in which fluid can flow through the first opening and a closed configuration in which fluid is prevented from flowing through the first opening;
a second panel moveably attached to the main body and moveable between an open configuration in which fluid can flow through the second opening and a closed configuration in which fluid is prevented from flowing through the second opening;
a spacer disposed within the channel, the spacer obstructing fluid flow through the channel; and
a fluid pressurizer disposed within the channel;
wherein the main body defines a wing of an aircraft.

* * * * *